US006813724B2

(12) United States Patent
Saito

(10) Patent No.: US 6,813,724 B2
(45) Date of Patent: *Nov. 2, 2004

(54) PHASE-CONTROLLED SOURCE SYNCHRONOUS INTERFACE CIRCUIT

(75) Inventor: Tatsuya Saito, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 610 days.

This patent is subject to a terminal disclaimer.

(21) Appl. No.: 09/796,557

(22) Filed: Mar. 2, 2001

(65) Prior Publication Data
US 2001/0020278 A1 Sep. 6, 2001

(30) Foreign Application Priority Data
Mar. 6, 2000 (JP) ........................................ 2000-060117

(51) Int. Cl.$^7$ ................................................ G06F 1/12
(52) U.S. Cl. ........................................ 713/401; 327/149
(58) Field of Search ................ 713/401; 365/233; 327/149

(56) References Cited

U.S. PATENT DOCUMENTS

| 5,706,484 A | * | 1/1998 | Mozdzen et al. | ............ 713/400 |
| 6,011,732 A | * | 1/2000 | Harrison et al. | ............ 365/194 |
| 6,202,168 B1 | * | 3/2001 | Saito et al. | ................. 713/600 |
| 6,452,421 B2 | * | 9/2002 | Saito | ........................ 326/93 |
| 6,621,760 B1 | * | 9/2003 | Ahmad et al. | .............. 365/233 |

FOREIGN PATENT DOCUMENTS

| EP | 424741 A2 | 5/1991 |
| EP | 810508 A2 | 12/1997 |
| WO | WO96/29655 | 9/1996 |

OTHER PUBLICATIONS

D. Woeste et al, "Digital–Phase Aligner Macro for Clock Tree Compensation with 70ps Jitter", IEEE International Solid–State Circuits Conference, 1996, pp. 136–137.

"Binary Weighted Element Pulse Delay Line", IBM Technical Disclosure Bulletin, vol. 39, No. 6, Jun. 1996, pp. 153–154.

* cited by examiner

Primary Examiner—Thomas Lee
Assistant Examiner—Albert Wang
(74) Attorney, Agent, or Firm—Mattingly, Stanger & Malur, P.C.

(57) ABSTRACT

A source synchronous type interface circuit in which, for fetch of a transmitted data, a source synchronous clock indicating a data transmission timing is transmitted from transmission to reception side along with the data, so that a reception clock is generated to define an operation timing of a first reception flip-flop for taking in a data from the reception signal of the source synchronous clock. The interface further includes a second reception flip-flop for feeding an output from the first reception flip-flop further to a second reception flip-flop in synchronization with a common system clock and a variable delay circuit for absorbing phase fluctuations of the first reception flip-flop depending on transmission delay time, to assure a phase difference required for correctly receiving the data. The variable delay circuit has a delay amount automatically controlled according to phase differences between the system clock and the source synchronous clock received.

14 Claims, 16 Drawing Sheets

PHASE-CONTROLLED SOURCE SYNCHRONOUS INTERFACE CIRCUIT

BACKGROUND OF THE INVENTION

The present invention relates to a circuit technique for passing data signals between a plurality of logic circuits and in particular, to a technique applicable even when a transmission delay of the data signals greatly varies, i.e., a technique for adjusting the delay time and adjusting the phase upon signal reception to a desired value, thereby realizing a normal transmission.

In a logic circuit apparatus such as a computer, a plurality of logic circuits are synchronized with a single system clock when passing data signals between logic circuits in the apparatus.

To operate these circuits normally, data signals transmitted should reach a predetermined destination within a desired time. Such a transmission technique is disclosed, for example, in WO096/29655 laid open on Sep. 26, 1996.

FIG. 13 shows an example of this convention data signal transmission method for transmitting data signals between logic circuits.

In FIG. 13, a reference symbol 1301 denotes a logic circuit for transmitting a signal and 1304 denotes a logic circuit for receiving the signal. A flip-flop 1304 takes in an output from the other circuit block 1303 in the logical circuit 1301 in synchronization with a system clock SCK. A resultant data signal is transmitted via a driver 1305 to a data transmission line 1306. A data signal received at a receiver 1307 of the logic circuit 1302 is fed to a flip-flop 1309 operating in synchronization with the system clock SCK and then transmitted to the other circuit block in the logic circuit 1302.

FIG. 14 shows a timing relationship of this transmission: a signal SCK is a system clock signal; a signal D1 is an output signal from the flip-flop 1304; a signal D2 is an input signal to the flip-flop; and a signal D6 is an output signal from 1309.

As shown in this figure, for example, in order that output of a signal D2 to the flip-flop 1304 be accompanied by output of a signal D6 with a delay of two system clock cycles, it is necessary to design delay time values of the flip-flop 1304, the driver 1305, the data transmission line 1306, the receiver 1307, and the flip-flop 1309, so as to satisfy a formula below:

$$Tck < Td < 2 \times Tck \qquad (1)$$

wherein Tck represents the system clock cycle and Td represents a delay time from the signal D2 to D3 (including the delay time of the flip-flop).

However, this conventional example has a problem that the delay time values of the respective circuits or the data transmission line 1306 may fluctuate due to the production process fluctuation, disabling a normal data signall transmission.

FIG. 15 shows a case when the delay time Td is changed to increase ΔTd.

In this case, as shown in the figure, the input data signal D2 of the flip-flop has a phase almost matched with a phase of the system clock signal SCK. For this, the flip-flop 1309 cannot assure a setup time required for correctly receive the data (time required for correcting receiving the data, i.e., a period of time between the moment when the data signal value is identified and the moment when the system clock signal is input) or hold time (time required for correctly receiving the data, i.e., a period of time for maintaining the data signal at a constant value after the input of the system clock signal). The output data signal has a logical value not defined to be "0" or "1", i.e., in a meta-stable state as described in the conventional example, disabling to correctly perform a signal transmission.

To evade this, as shown in the conventional example, it is necessary to arrange a plurality of stages of flip-flop at the later stage of the flip-flop 1309, so as to synchronize the data signal. This increases the signal transmission time, adversely affecting the high-speed technique.

To solve the problem that the fluctuation of data transmission time between the logic circuits disables a correct transmission, for example, the aforementioned Patent Publication WO96/29655 discloses a source synchronous system for transmitting a clock signal in parallel with a data signal to be transmitted from a transmission side to a reception side.

FIG. 16 shows the principle of this conventional source synchronous system.

A flip-flop 1604 is supplied with an output from other circuit block 1603 in a logic circuit 1601 in synchronization with a system clock SCK. A resultant data signal is transmitted via a driver 1605 to a data transmission line 1606. Moreover, the logic circuit 1601 includes a source synchronous clock generator for generating a source synchronous clock signal DCK from a system clock SCK and a driver 1613 for transmitting the source synchronous clock signal DCK to a clock transmission line. In a logic circuit 1602 of the reception side, the source synchronous clock signal DCK is received by a receiver 1615 is distributed via a distributor 1616 to a flip-flop 1608. In synchronization with this source synchronous clock signal DCK distributed, the flip-flop 1608 takes in the data received by a receiver 1607. An output from the flip-flop 1608 is supplied to a flip-flop 1609 which is in synchronization with the system clock SCK. That is, the logical level is decided at the timing synchronized with the system clock SCK and held before supplied to the other circuit block 1610.

FIG. 17 shows a relationship of a data transmission timing relationship in this source synchronous system.

A signal SCK is a system clock; a signal D2 is an output signal from the flip-flop 1604; a signal D3 is an input signal to the flip-flop 1608; a signal D4 is an output signal from 1608, which is an input signal to the flip-flop 1609; and a signal D6 is an output signal from 1609. A signal C4 is an output signal from the source synchronous clock generator; a signal C5 is an input signal to a clock distributor; and a signal C6 is a source synchronous clock signal supplied to the flip-flop 1608.

In this method, as shown in Formula 2 below, a delay time Td of a data signal from the output of the flip-flop 1604 to the input of the flip-flop 1608 (including a delay time of the flip-flop 1604) is approximately identical to a delay time Tc1 from the output of the source synchronous clock generator 1612 to the input of the clock distributor 1616 (including a delay time of the generator 1612) because the length of wiring 1606 for a data signal is designed to be approximately equal to the length of wiring 1614 for the source synchronous clock signal DCK.

$$Td \approx Tc1 \qquad (2)$$

Consequently, when the delay time Tc2 from the input of the clock distributor 1616 to the flip-flop 1608 is designed to be about ½ of the system clock cycle Tck, as shown in this figure, the flip-flop 1608 can normally receive the data signal D2 and the data signal D3 received by the flip-flop 1608 can be received like the data signal D4 by the flip-flop 1609.

According to this method, Formula 2 is always satisfied approximately because even when delay time values of the respective circuits 1604, 1605, 1607, 1612, 1613, and 1615 or delay time values of the data transmission line 1606 and the clock transmission line 1614 fluctuate because of the production process irregularities, the delay time values fluctuate in the same direction thanks to the effect of the aforementioned design.

Accordingly, to transmit data between the logic circuits, what is necessary is to design the delay time values of 1604, 1605, 1606, 1607, 1612, 1613, 1614, and 1615 so as to satisfy Formula 2.

However, even in this conventional source synchronous system, there is a case when a correct signal transmission cannot be performed.

FIG. 18 shows a case when the delay time Td and the Tc1 in FIG. 16 are shifted to be increased by $\Delta Td$ and $\Delta Tc1$, respectively. In this case also, Formula below is satisfied $$Td+\Delta Td \approx Tc1+\Delta Tc1 \quad (3)$$

and the flip-flop 1608 can normally receive the data signal D2.

However, in this case, as shown in the figure, the data signal D4 received by the flip-flop 1609 has a phase almost matched with that of the system clock signal SCK. Accordingly, the flip-flop 1609 receiving the data signal D4 at the timing of the system clock signal SCK cannot assure a setup time or a hold time required for correctly receiving the data and the output data signal has a value in the meta-stable state, disabling to perform a normal signal transmission.

To evade this, as described above, it is necessary to arrange a plurality of stages of flip-flop at the later stage of the flip-flop 1609, for synchronizing the data signal, which increases the signal transmission time, adversely affecting the high-speed technique.

SUMMARY OF THE INVENTION

It is therefore an object of the present invention to correctly receive a transmission data regardless of data transfer delay time fluctuations caused by the production process irregularities.

Another object of the present invention is to assure a correct reception operation by an automatic phase control of the data, thereby enabling a high-speed data transfer.

Still another object of the present invention is to reduce the cost for the data phase controller for correcting receiving a transmission data.

Yet another object of the present invention is to provide a highly-flexible interface circuit capable of handling system clocks having different cycles as a data transfer cycle base without changing the circuit configuration.

The present invention basically employs the technique of the source synchronous system. That is, when data is transmitted from a transmission side to a reception side, a source synchronous clock is transferred via a clock transmission line designed in equal length to that of the data transmission line for transmission of the data. At the reception side, the data is received by a first flip-flop operating in synchronization with the received source synchronous clock with a predetermined phase difference and an output from the first flip-flop is received by a second flip-flop operating in synchronization with a system clock. A representative embodiment of the present invention includes circuit means for adjusting the phase difference between the data received and output by the first flip-flop and the system clock. By synchronizing the first flip-flop with the source synchronous clock with a predetermined phase difference, it is possible to assure a setup time and a hold time required for the reception operation by this first flip-flop without causing a meta-stable state. Furthermore, in the reception operation by the second flip-flop, the aforementioned circuit means performing the automatic adjustment serves to evade generation of a meta-stable state. Accordingly, it is possible to receive normal data all the time as a whole.

According to an embodiment of the present invention, the circuit means adjusting the data phase is arranged at the reception side. That is, the logic circuit at the reception side includes a phase comparator for detecting a phase difference between the received source synchronous clock and the system clock, and a variable delay circuit inserted between the first flip-flop and the second flip-flop, for controlling the delay time according to an output from the phase comparator. More specifically, a delay equivalent to the phase difference detected is given by the variable delay circuit. The first flip-flop operates with a predetermined phase difference (normally, ½ cycle of the system clock) against the source synchronous clock transmitted. An output from the first flip-flop is delayed by a value to compensate the phase difference against the system clock when input to the second flip-flop. Accordingly, a predetermined phase difference is maintained between the input change timing and the system clock as the operation timing of the second flip-flop.

According to another embodiment of the present invention, the circuit means for automatically adjusting a phase of the data received and output by the first flip-flop is arranged at the transmission side. That is, as a transmission clock for defining timings of a data transmission and a source synchronous clock transmission, a clock adjusted by the variable delay circuit is used instead of the system clock. An adjustment clock is transmitted for transferring phase information from the logic circuit of the reception side to the logic circuit of the transmission side, i.e., in the reverse direction against the data flow. The adjustment clock is generated from the system clock in the logic circuit of the reception side. The logic circuit of the transmission side is provided with a phase comparator for detecting a phase difference between the adjustment clock transmitted and the system clock. According to the comparison result of this comparator, the delay amount of the aforementioned variable delay circuit is controlled. In this configuration, the output from the first flip-flop at the reception side operating with a predetermined phase difference against the received source synchronous clock changes at a timing controlled so as to have a predetermined phase difference against the system clock regardless of the actual delay amount generated in the data or source synchronous clock transmission. Accordingly, the second flip-flop taking in this output from the first flip-flop in synchronization with the system clock will not enter a meta-stable state. In this configuration, even when a plurality of data items are transmitted in parallel, phases of all the data items can be controlled with a single variable delay circuit, thereby reducing the circuit cost.

According to yet another embodiment of the present invention, the variable delay circuit adjusting the data phase is arranged at the transmission side and detection of a phase difference used for controlling the delay amount of the variable delay circuit is performed at the reception side. More specifically, the reception side includes a phase detection circuit for detecting a phase difference between the source synchronous clock and the system clock and the phase difference value is transmitted to the logic circuit of the transmission side. The logic circuit of the transmission side includes a variable delay circuit having a delay amount controlled according to the phase difference value. The system clock which has passed through this variable delay circuit is used for transmission of data and transmission of a source synchronous clock. This configuration also has an advantage that when a plurality of data items are transmitted in parallel, it is possible to assure a normal data reception with a reduced circuit cost.

DETAILED DESCRIPTION OF THE EMBODIMENTS

Figure 1:
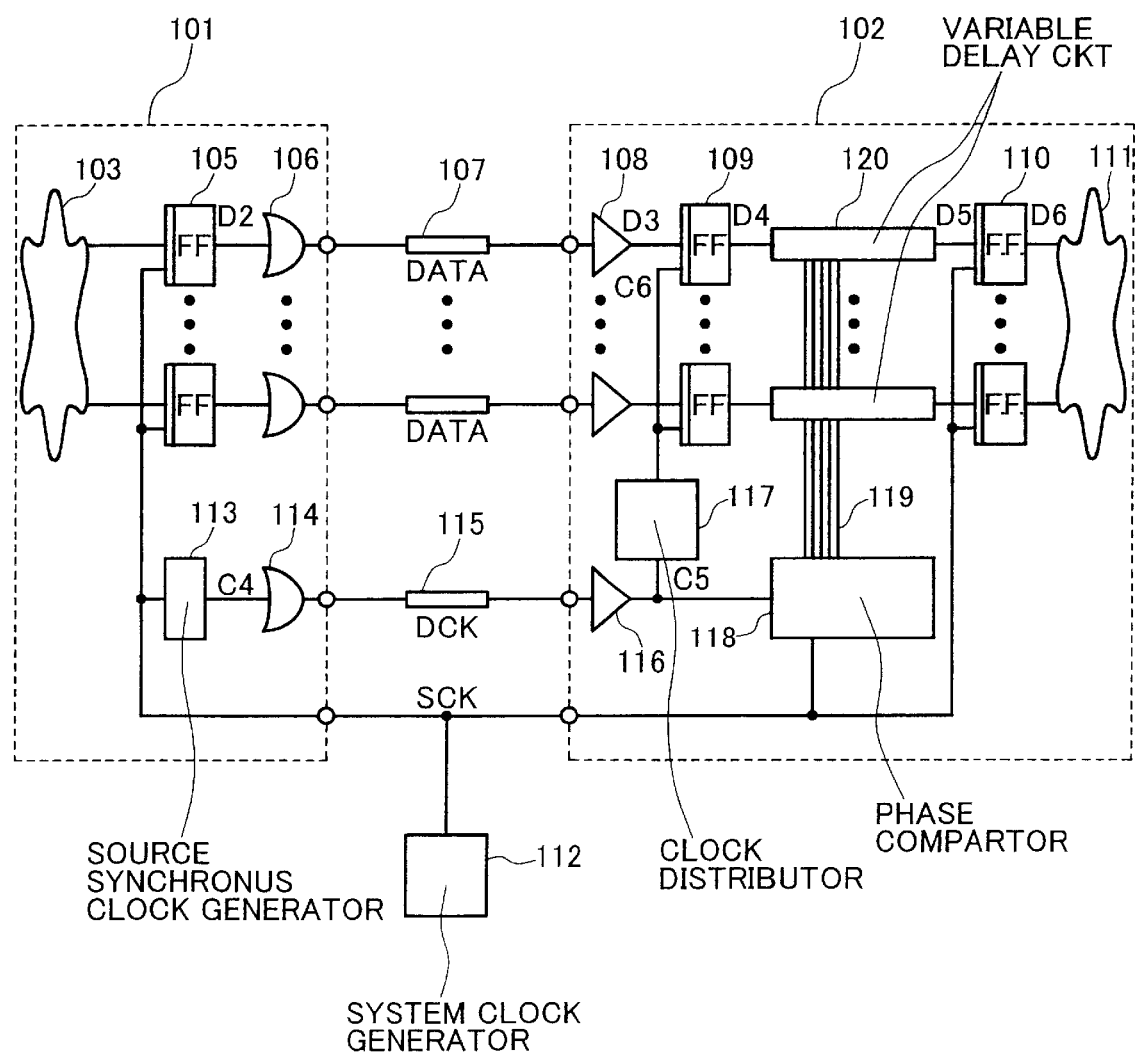
FIG. 1 is a block diagram showing a configuration of an interface circuit according to a first embodiment of the present invention.

FIG. 1 shows a basic configuration of an interface circuit according to an embodiment of the present invention.

In FIG. 1, a reference symbol 101 denotes a logic circuit at the side transmitting a signal and 102 denotes a logic circuit at the side receiving the signal. In this embodiment, these circuits are constituted by an integrated circuit. The logic circuit 101 transmits a plurality of data signals DATA to the logic circuit 102 with a source synchronous clock DCK. All the data signals operate similarly and hereinafter explanation will be given on one of the data signals as an example. Moreover, it can also be considered to use a plurality of signals as the source synchronous clock signal. In this case also, the operation is similar to the explanation given below. Thus, explanation will be given on a case when a single source synchronous clock signal is used.

A flip-flop circuit 105 receives a data signal from the other circuit block 103 in a logic circuit 101 and transmits it in synchronization with a system clock signal SCK generated in a common clock signal source 112.

A reference symbol 107 denotes a data transmission line for transmitting a data signal from the logic circuit 101 to the logic circuit 102 and is formed on a substrate on which the integrated circuit 101 and 102 are mounted.

A reference symbol 106 denotes a driver for driving the line 107, 108 denotes a receiver circuit for transferring the transmitted data signal to an interior of the integrated circuit, and 109 denotes a flip-flop circuit for receiving the data signal at a timing of the source synchronous clock signal DCK.

The data signal DATA is transmitted from 105 via 106, 107, and 108 to 109.

Moreover, in this circuit, a source synchronous clock generator 113 is provided in the logic circuit 101 of the transmission side, where a source synchronous clock signal DCK is generated from the system clock SCK.

The source synchronous clock signal DCK is transmitted via a driver 114 to the logic circuit 102 of the reception side by a DCK transmission line 115, the length of which is designed to be approximately equal to the length of the line 107. Furthermore, the DCK goes through a DCK receiver circuit 116 and a source synchronous clock distributor 117 so as to be supplied to a reception flip-flop circuit 109.

This embodiment is characterized in that a variable delay circuit 120 is provided for adjusting the delay time of the data signal received by the reception flip-flop 109 and that a control signal 119 for controlling the delay amount of the variable delay circuit 120 is generated by a phase comparator 118 which detects a phase difference between the source synchronous clock signal DCK and the system clock signal SCK.

The data signal whose delay time has been adjusted by the variable delay circuit is received by the flip-flop 110 at the next timing of system clock SCK and transmitted to the other logic circuit 111.

Next, explanation will be given on the operation of the data signal transmission according to this embodiment with reference to FIG. 2.

Figure 2:
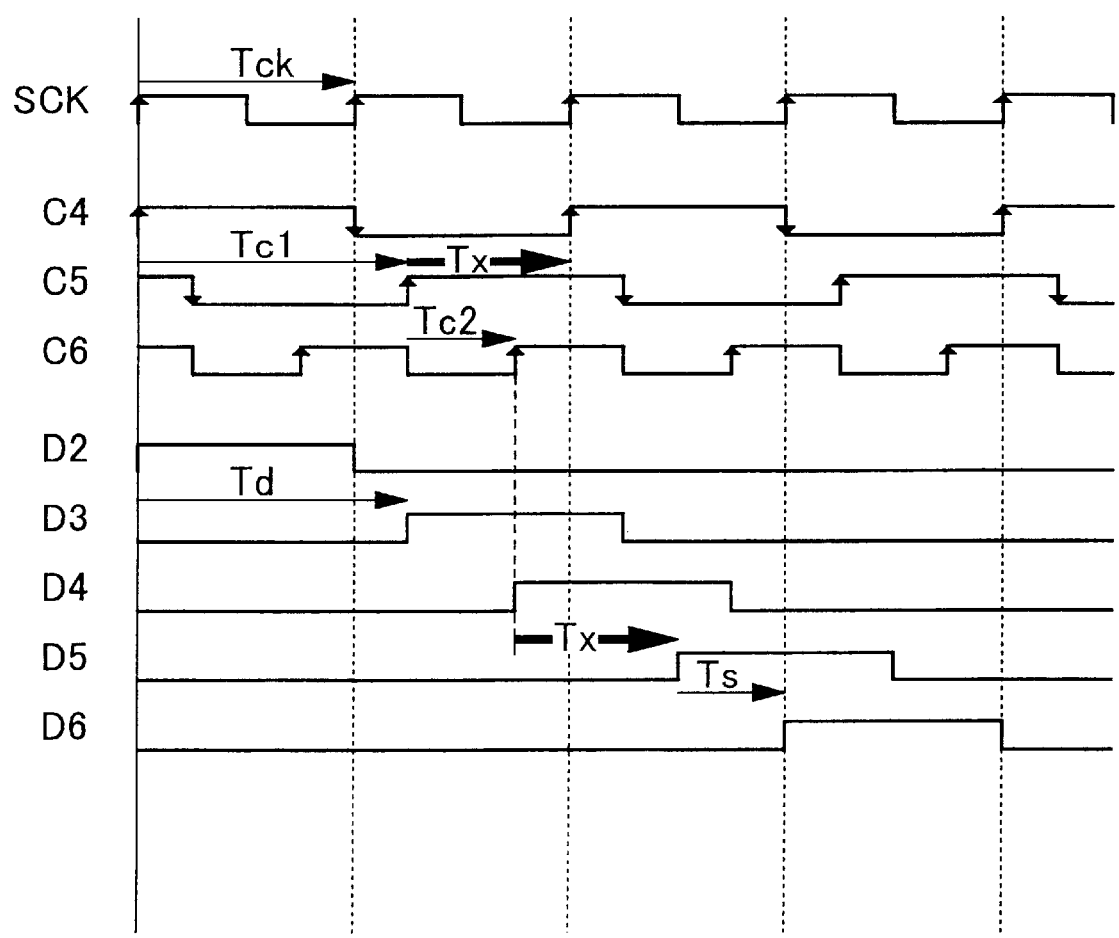
FIG. 2 shows timings of signals at respective components of the aforementioned embodiment in a certain state.

In FIG. 2, a signal SCK is a system clock signal having a cycle Tck.

A signal C4 is an output signal from the source synchronous clock generator 113 and a signal C5 is an output signal from a DCK receiver circuit 116. The signal C5 has a phase delayed by Tc1 as compared to that of the system clock SCK and this delay is equal to a time required for the source synchronous clock signal to be transmitted through the source synchronous clock generator 113, the output circuit 114, the line 115, and the input circuit 116.

Moreover, a signal C6 is a source synchronous clock signal DCK given to the flip-flop 109 which receives the data signal. This signal C6 has a phase delayed from the signal C5 by Tc2 which is equal to a time required for the source synchronous clock signal DCK to be transmitted from the receiver circuit 116 via the distributor 117 to the flip-flop 109.

Moreover, a signal D2 is an output signal from the flip-flop 105 transmitting the data signal, and a signal D3 is an output signal from the receiver circuit 108 of the data signal. This signal D3 has a phase delayed from the system clock SCK by Td which is equal to a time required for the data signal to be transmitted through the flip-flop 105, the output circuit 106, the line 107, and the receiver circuit 108.

Here, in the same way as has been explained for the conventional technique, since the data signal DATA and the source synchronous clock signal DCK are transmitted using transmission lines of approximately equal lengths, the aforementioned phase difference Td and Tc1 are almost identical to each other as shown by Formula 4 below.

$$Td \approx Tc1 \tag{4}$$

Accordingly, as shown in Formula 5 below, when the delay time Tc2 is designed to be about ½ of the system clock cycle Tck, the flip-flop 109 can normally receive the data signal D3.

$$Tc2 \approx \tfrac{1}{2} \times Tck \tag{5}$$

In this case, the output signal D4 from the flip-flop 109 has a phase delayed from the system clock signal SCK by (Tc1+Tc2) as shown in FIG. 2.

In this embodiment, the phase comparator 118 detects a phase difference Tx between the phase of the output signal C5 from the DCK receiver circuit 116 and the phase of the system clock SCK. The phase comparator 118 will be detailed later.

The detection result serves as the control signal 119 which is transmitted to the variable delay circuit 120 and its delay amount is controlled to be Tx. The variable delay circuit 120 will be detailed later.

As a result, as shown in FIG. 2, the output signal D4 from the flip-flop 109 is delayed by Tx in the variable delay circuit 120 and supplied to the input of the flip-flop 110.

Explanation will be given on phase relationships between the respective components of this embodiment. Firstly, the phase comparator 118 operates to satisfy Formula 6 below.

$$Tc1+Tx=2 \times Tck \tag{6}$$

Moreover, a phase difference Ts between the signal D5 and the system clock SCK is defined by the operation of the variable delay circuit 120 to be expressed by Formula 7 below.

$$Ts=3 \times Tck-(Tc1+Tc2+Tx) \tag{7}$$

Consequently, from the Formulae 6, 7, and 5, the relationship between the phase difference Ts and the SCK cycle Tck is constant as shown by Formula 8 below.

$$Ts \approx \tfrac{1}{2} \times Tc \tag{8}$$

That is, according to the present invention, the signal D5 has a phase difference against the system clock signal SCK is always half of the SCK cycle.

This phase difference is sufficient for the flip-flop 110 to receive a signal without causing a meta-stable state and to be assured to receive a data signal like a signal D6 at the next timing of the system clock signal SCK.

Moreover, in the configuration of the present embodiment, it is possible to assure reception of the data signal even when the delay time Td of the data signal DATA and the delay time Tc1 of the source synchronous clock signal DCK fluctuate.

Figure 3:
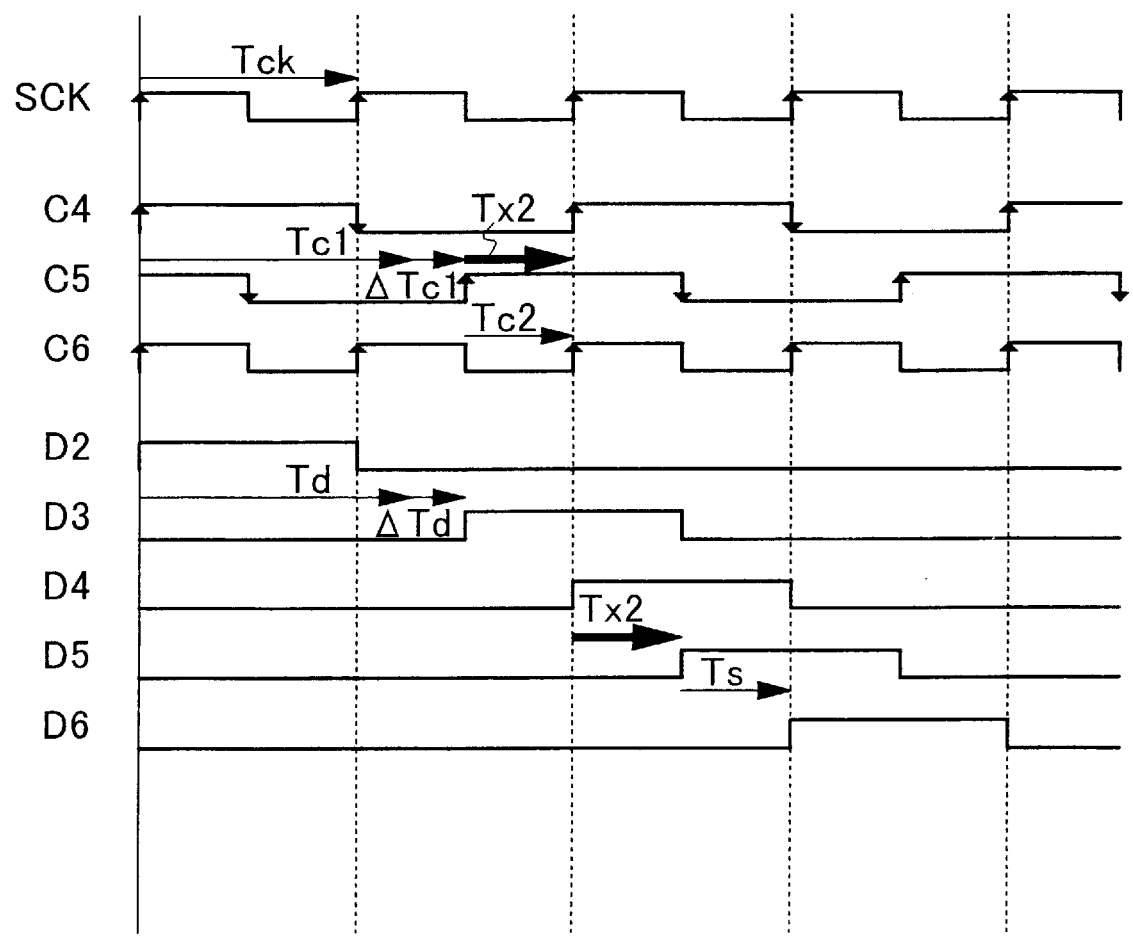
FIG. 3 shows timings of the signals at the respective components of the aforementioned embodiment in another state.

FIG. 3 is a diagram explaining the data signal transmission according to the present invention when these delay time values fluctuate.

In FIG. 3, the system clock SCK, the source synchronous clock signals C4, C5, and C6, and the data signals D2, D3, D4, D5, and D6 are signals at the respective component in the same way as shown in FIG. 2.

Unlike FIG. 2, FIG. 3 shows a case when the source synchronous clock signal C5 has a phase delayed from the system clock SCK by (Tc1+ΔTc1) and the data signal D3 has a phase delayed from the system clock SCK by (Td+ΔTd).

Here also, the phase difference (Td+ΔTd) is approximately equal to the phase difference (Tc1+ΔTc1) as shown Formula 9 below.

$$(Td+\Delta Td) \approx (Tc1+\Delta Tc1) \tag{9}$$

Moreover, in this example also, as in Formula 5, the flip-flop 109 can normally receive the data signal D3 when a delay time Tc2 required for the source synchronous clock signal DCK to reach from the input circuit 116 via the distributor 117 to flip-flop 109 is designed to be about ½ of the system clock cycle Tck.

In this case, the output signal D4 from the flip-flop 109 is, as shown in FIG. 3, delayed from the phase of the system clock SCK by (Tc1+ΔTc1+Tc2)

Here, the phase relationship between the respective signals is as follows.

A phase difference Tx2 between the phase of the output signal C5 from the DCK receiver circuit 116 and the phase of the system clock SCK is defined by the operation of the phase comparator 118 to be as shown in Formula 10 below.

$$Tc1+\Delta Tc1+Tx2=2 \times Tck \tag{10}$$

Moreover, a phase difference Ts2 between the signal D5 and the system clock SCK is defined by the operation of the variable delay circuit 120 so as to be as shown in Formula 11 below.

$$Ts2=3 \times Tck-(Tc1+\Delta Tc1+Tc2+Tx2) \tag{11}$$

Consequently, from Formulae 10, 11, and 5, the phase difference Ts2 between the signal D5 and the system clock SCK can be expressed as shown in Formula 12 below.

$$Ts2 \approx \tfrac{1}{2} \times Tck \tag{12}$$

Thus, according to the present invention, even when the delay time Td of the data signal DATA fluctuates by +ΔTd and the delay time Tc1 of the source synchronous clock signal DCK fluctuates by +ΔTc1, as shown in FIG. 3, the phase difference of the signal D5 against the system clock SCK can be assured to be half of the SCK cycle. Accordingly, in this case also, the flip-flop 110 is assured to receive the data signal like the signal D6 at the next timing of the system clock signal SCK.

As has been described above, according to the present embodiment, even when the delay time Td of the data signal and the delay tine Tc1 of the source synchronous clock signal fluctuates due to production process irregularities and the fluctuations of the operation temperature, operation voltage, and the like, it is possible to assure a sufficient phase difference between the data signal and the clock signal at the flip-flop of the reception side and realize a data signal transmission without causing a meta-stable state as in the conventional example.

It should be noted that the embodiment has been explained for the case expressed by Formulae 13 and 14 below.

$$Tckx1 < Td < Tckx2 \quad (13)$$

$$Tckx1 < Tc1 < Tckx2 \quad (14)$$

However, the present invention can be applied to all the cases when n in Formulae 15 and 16 below is an integer not smaller than 0.

$$Tckxn < Td < Tckx(n+1) \quad (15)$$

$$Tckxn < Tc1 < Tckx(n+1) \quad (16)$$

Moreover, explanation has been given on the present embodiment when the logic circuit 101 at the transmission side and the logic circuit 102 of the reception side are integrated circuits and the lines for transmitting a data signal and a source synchronous clock signal are a printed circuit board on which the logic circuits are mounted. However, the present invention can be applied to all the interface circuits for transmitting a signal between a plurality of logic circuits.

For example, the present invention can also be applied to a case when the logic circuits at the transmission side and the reception side are computers which are connected by a signal transmission cable for transmitting a signal as well as a case when the logic circuits at the transmission side and the reception side are logic circuit blocks each performing a particular processing within an integrated circuit and connected by a line formed on an integrated circuit so as to transmit a signal.

Moreover, the present invention can also be applied to a case when the line used for a signal transmission is not a single line but is realized a plurality of lines connected by a repeating element or a repeater.

These features of the present invention can also be applied to the other embodiments which will be detailed below.

The aforementioned embodiment is a so-called single-direction transmission in which logic circuits of a transmission side and a reception side are connected by 1:1, i.e., a so-called point to point connection, and a signal is transmitted from the transmission side to the reception side. However, the present invention can also be applied to a so-called bus connection in which a single line is common by a plurality of logic circuits for transmitting signals. Moreover, the present invention can also be applied to a so-called bi-directional transmission in which a line is common for a data transmission and reception.

Figure 4:
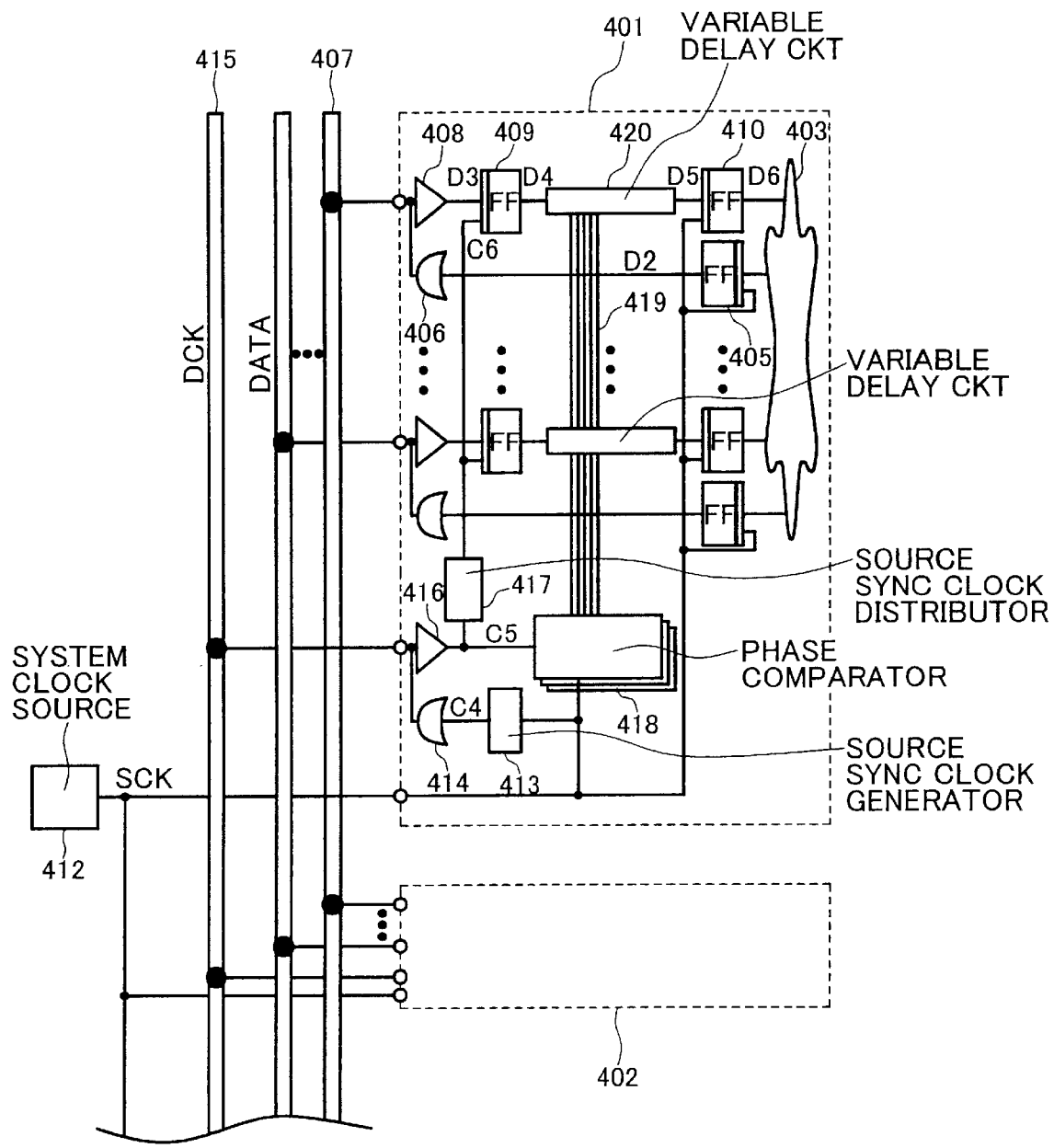
FIG. 4 is a block diagram showing a configuration of an interface circuit according to another embodiment.

FIG. 4 shows an interface circuit according to a second embodiment of the present invention. This embodiment is an interface circuit for a bi-directional signal transmission in which logic circuits are connected by a bus for transmitting and receiving signals.

In FIG. 4, a reference symbol 401 denotes a logic circuit for transmitting and receiving signals and 402 denotes the other logic circuit having a configuration identical to 401 for transmitting and receiving signals. It should be noted that it is also possible to further connect a plurality of logic circuits identical to 402. However, such a configuration operates similarly and only 402 is depicted here and the others are omitted.

A plurality of data signals DATA are transmitted between 401, 402, and the other logic circuits. Moreover, in parallel to them, a source synchronous clock signal DCK is transmitted. It should be noted that hereinafter explanation will be given on a case using a single data signal and a single source synchronous clock signal in the same way as in FIG. 1.

When the logic circuit 401 serves as the transmission side, a flip-flop 405 receives a data signal from the other logic circuit 403 in the logic circuit 401 and transmits the signal in synchronization with a system clock SCK generated in a common clock signal source 412.

A reference symbol 407 denotes a line for transmitting a data signal from 401 to 402 or to the other logic circuit. A reference symbol 406 denotes a driver driving the line 407. Moreover, in this circuit, a source synchronous clock generator 413 is arranged for generating a source synchronous clock signal DCK from the system clock SCK. The source synchronous clock signal DCK is transmitted via a driver 414 and a DCK transmission line 415 arranged in parallel to the data signal transmission line 407 to the other logic circuit of the reception side.

When the logic circuit 401 serves as the reception side, an input circuit of 408 transfers a data signal from the other logic circuit, to inside of the integrated circuit, so that the data signal is received by a flip-flop 409 at a timing of the source synchronous clock signal DCK. Moreover, the source synchronous clock signal DCK is supplied via a DCK receiver circuit 416 and a source synchronous clock distributor 417 to a reception flip-flop 409. The data signal received by the reception flip-flop 409 is adjusted in a delay time by a variable delay circuit 420 and received by a flip-flop 410 at the next timing of the system clock SCK so as to be transmitted to the other logic circuit 403.

It should be noted that in the same way as the case of FIG. 1, as the feature of the present invention, a control signal 419 for controlling the delay amount of the variable delay circuit 420 is generated by a phase comparator 418 detecting a phase difference between the source synchronous clock signal DCK and the system clock signal SCK. However, unlike FIG. 1, in a case of bus connection, when a logic circuit at the transmission is side different, the signal phase received by the logic circuit 401 is varied according to a distance between the logic circuits.

Accordingly, in this embodiment, a plurality of phase comparators 418 are arranged and a plurality of phase difference information items are retained for respective logic circuits at the transmission side and the control signal 419 is switched according to which of the logic circuits is transmitting a signal via the bus. It should be noted that a configuration required for switching the control signal 419 is not depicted.

In the case of FIG. 4 also, operation of the data signal transmission is identical to the timing relationship explained with reference to FIG. 2 and FIG. 3. For example, when the integrated circuit 401 transmits a signal and the integrated circuit 402 receives the signal, in FIG. 2 and FIG. 3, the waveforms C4 and D2 correspond to the phase of the signal waveform in 401 while the waveforms C5, C6, D3, D4, D5, and D6 correspond to the phase of the signal waveform in 402. On the contrary, when the integrated circuit 402 transmits a signal and the integrated circuit 401 receives a signal, in FIG. 2 and FIG. 3, the waveforms C4 and D2 correspond to the phases of the signal waveforms in 402 while the waveforms C5, C6, D3, D4, D5, and D6 correspond to phases of signal waveforms in 401. Accordingly, with this configuration, Formulae 4 to 12 are satisfied as in the embodiment described with reference to FIG. 1, and it is possible to assure a sufficient phase difference between the data signal and the clock signal at the reception side, thereby enabling to realize a data signal transmission without causing a meta-stable state as in the conventional example.

Moreover, in this configuration also, the present invention can be applied to all the cases when n is an integer not smaller than 0 in the aforementioned Formulae 15 and 16.

In the aforementioned embodiment, the logic circuit at the side receiving a data signal has the phase comparator and the variable delay circuit. However, the present embodiment may also have a configuration that the logic circuit at the side transmitting a data has the phase comparator or the variable delay circuit. This configuration will be detailed below.

Figure 5:
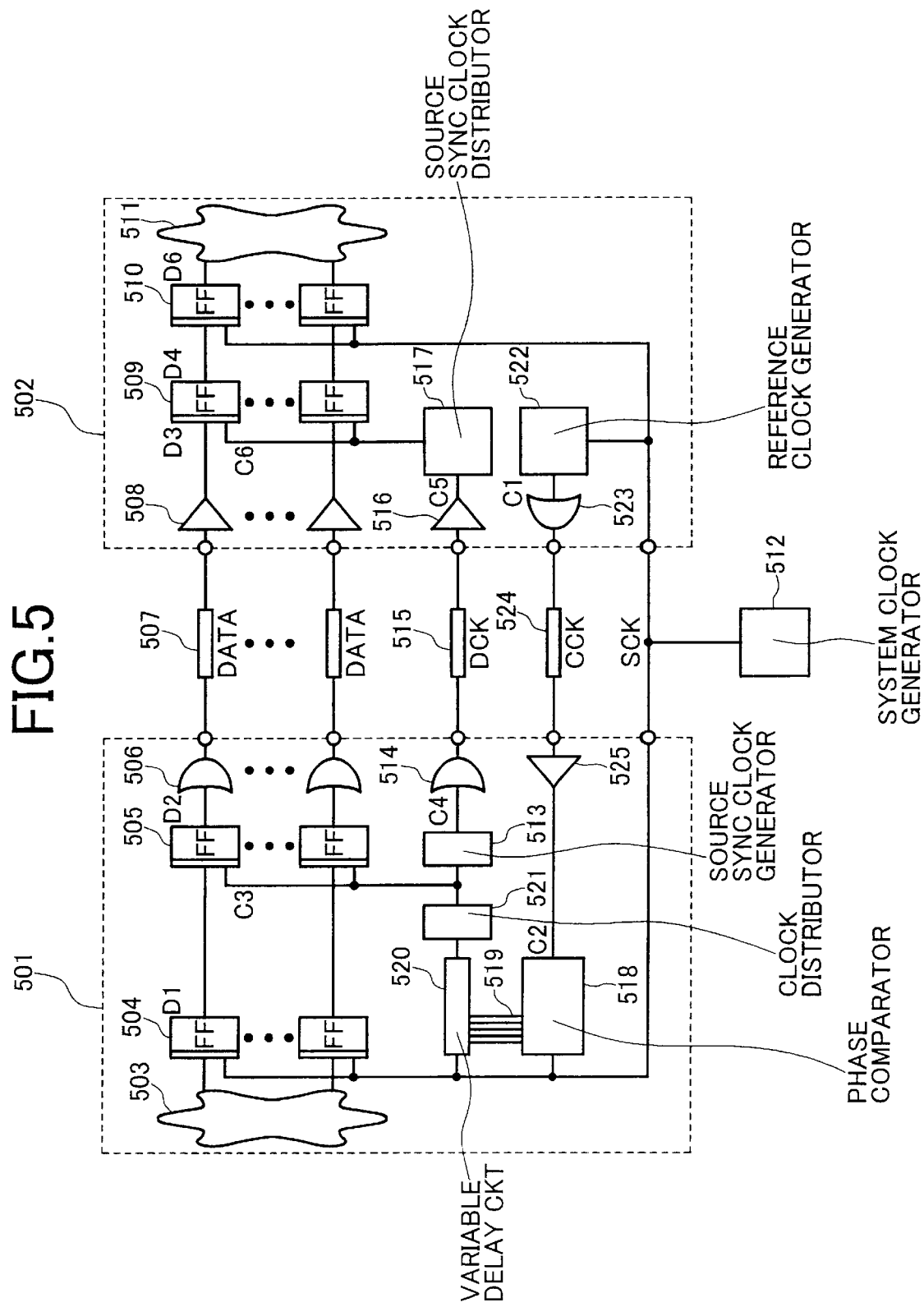
FIG. 5 is a block diagram showing a configuration of an interface circuit according to still another embodiment.

FIG. 5 shows an interface circuit according to a third embodiment of the present invention. In this embodiment, the logic circuit at the transmission side has the phase comparator and the variable delay circuit.

In FIG. 5, a reference symbol 501 denotes a logic circuit at the signal transmission side, and 502 denotes a logic circuit at the signal reception side. These circuits are formed as integrated circuit in this figure. A plurality of data signal DATA and a source synchronous signal DCK are transmitted from 501 to 502. Moreover, in parallel with the aforementioned data signal, an adjusting clock signal CCK is transmitted from the logic circuit 502 of the reception side to the logic circuit 501 of the transmission side. All of lines 507 for transmitting DATA, a line 515 for transmitting DCK and a line 524 for transmitting CCK are designed to have an approximately same length. The DCK and the CCK may share a single transmission line but depicted as having separate transmission lines.

It should be noted that hereinafter explanation will given on a case having a single data signal line, a single source synchronous signal line, and an adjustment clock signal line 1.

In this embodiment, the logic circuit 502 at the reception side includes an adjusting clock generator 522, where the adjusting clock signal CCK is generated from the system clock SCK generated by a common clock signal source 512. The adjusting clock signal CCK is transmitted via a driver 523 and a CCK transmission line 524 and reaches the logic circuit 501. Furthermore, the CCK is supplied via a CCK receiver circuit 525 to a phase comparator 518. The phase comparator 518 detects a phase difference between the adjusting clock signal CCK and the system clock signal SCK and controls a variable delay circuit 520 by a control signal 519 based on the phase difference. The detection of the phase difference may be performed once at a system rise or at a predetermined interval or all the time after the system rise.

The variable delay circuit is supplied with the system clock signal SCK and its phase is adjusted according to the control signal 519. The clock signal after the phase adjustment is supplied to a flip-flop 505 transmitting a data signal and to a source synchronous generator 513.

Upon reception of a data signal from the logic circuit 503 in the logic circuit 501, the flip-flop 504 outputs it in synchronization with the system clock signal SCK and supplies its signal to a data signal transmission flip-flop 505. The flip-flop transmits it in synchronization with the clock signal after subjected the phase adjustment. A reference symbol 507 is a line for transmitting a data signal from 501 to 502. A reference symbol 506 denotes a driver for driving the line 507, and 508 is an receiver circuit for transferring the transmitted data signal into the integrated circuit. A reference symbol 509 denotes a flip-flop receiving the data signal at a timing of the source synchronous clock signal DCK. Moreover, the source synchronous clock signal DCK generated in the source synchronous clock generator 513 is transmitted via a driver 514 and a DCK transmission line 515, so as to be received by the logic circuit 502 at the reception side. Furthermore, the source synchronous signal DCK is supplied via a DCK receiver circuit 516 and a source synchronous clock distributor 517 to the flip-flop 509 for reception. The data signal received by the flip-flop 509 is received by a flip-flop 510 at the next timing of the system clock SCK and transmitted to the other logic circuit 511.

Next, explanation will be given on operation of data signal transmission according to the third embodiment with reference to FIG. 6.

Figure 6:
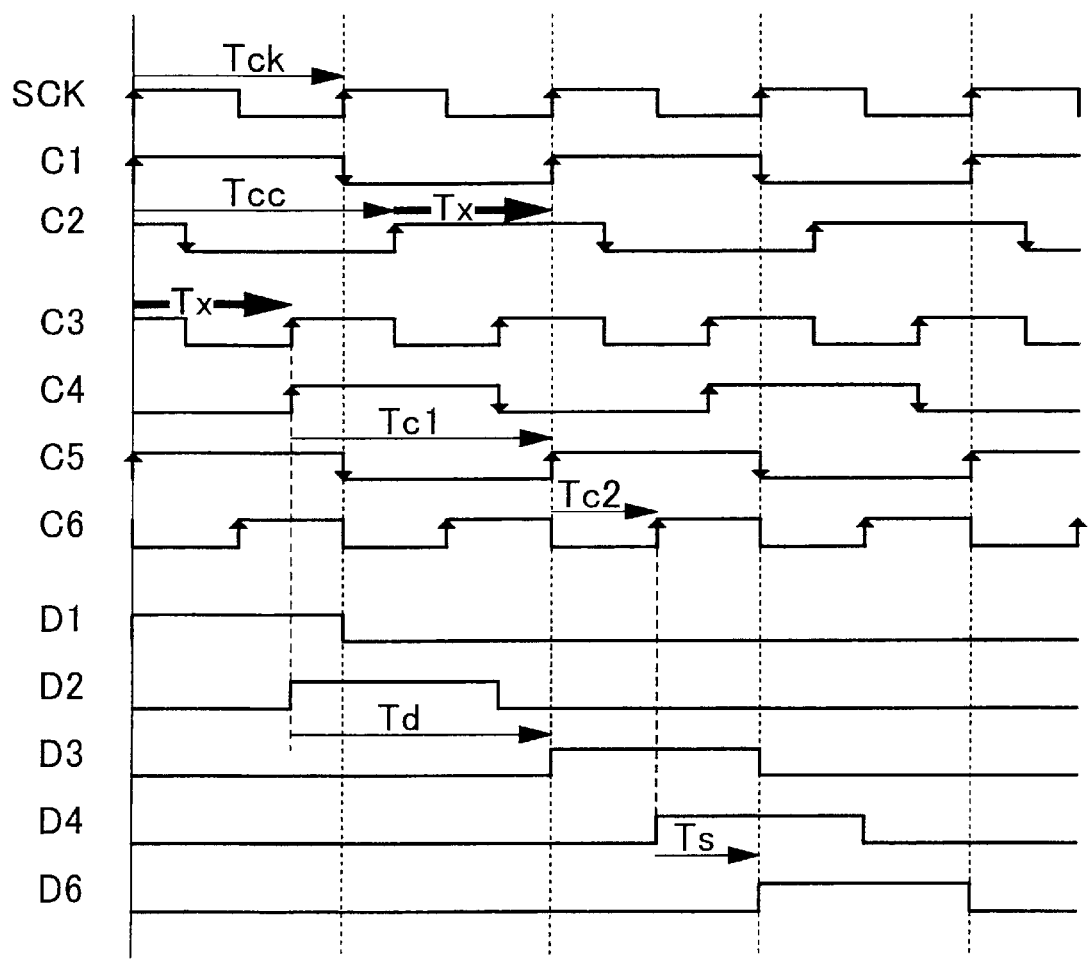
FIG. 6 shows timings of signals at respective components of the embodiment shown in FIG. 5.

In FIG. 6, a signal SCK is a system clock signal having a cycle Tck. A signal C1 is an output signal from the adjusting clock generator 222 and a signal C2 is an output signal from the CCK input circuit 525. This signal C2 has a phase delayed from a phase of the system clock SCK by Tcc, which is equal to a time required for the adjusting clock signal to be transferred through the adjusting clock generator 522, the output circuit 523, the line 524, and the input circuit 525.

In this example, the phase comparator 518 detects a phase difference Tx between the phase of the output signal C2 of the CCK receiver circuit 525 and the system clock SCK. The detection result is transmitted as a control signal 519 to the variable delay circuit 520 and the delay amount is controlled to be Tx.

As a result, as shown in FIG. 6, the clock signal after adjusted by the variable delay circuit 520 has a phase delayed from the system clock SCK by Tx like the signal C3 and is transmitted by the transmission clock distributor 521 to the data signal transmission flip-flop 505 and to the source synchronous clock generator 513.

It should be noted that here, explanation will be given on a case that the transmission clock distributor 521 has a delay time which can be considered to be almost 0. However, when the delay time of the distributor is too great to be ignored, by matching the delay time to be an integral multiple of Tck, an almost identical operation can be realized to the explanation here.

Moreover, In this circuit, the signal C4 is an output signal from the source synchronous clock generator 513 and a signal C5 is an output signal from the DCK receiver circuit 516. This signal C5 has a phase delayed from the system clock SCK by (Tx+Tc1). This Tc1 is equal to a time required for the source synchronous signal is transmitted through the source synchronous clock generator 513, the output circuit 514, the line 515, and the input circuit 516.

Moreover, a signal C6 is a source synchronous clock signal DCK supplied to the flip-flop 509 which receives the data signal. This signal C6 has a phase delayed from the signal C5 by Tc2, which is equal to a time required for the source synchronous signal DCK to be transmitted from the input circuit 516 via the distributor 517 to the flip-flop 509.

Moreover, signal D1 is an output signal from the flip-flop 504, signal D2 is an output signal from the flip-flop 505 transmitting the data signal, and signal D3 is an output signal from the receiver circuit 508 of the data signal. The signal D2 has a phase delayed from the phase of the system clock SCK by Tx. The signal D3 has a phase delayed from the system clock SCK by (Tx+Td). This Td is equal to a time required for the data signal to be transferred through the flip-flop 505, the output circuit 506, the line 507, and the receiver circuit 508.

In this embodiment also, as in the embodiment of FIG. 1, the phase difference Td is approximately equal to Tc1 as shown in Formula 17 below.

$$Td \approx Tc1 \qquad (17)$$

Consequently, as shown in Formula 18 below, the flip-flop 509 can normally receive the data signal D3 when the delay time Tc2 is designed to be about ½ of the system clock cycle Tck.

$$Tc2 \approx \tfrac{1}{2} \times Tck \qquad (18)$$

In this case, the output signal D4 from the flip-flop 509 has a phase delayed from the system clock signal SCK by (Tx+Tc1+Tc2) as shown in FIG. 6.

Moreover, in this embodiment, the data signal DATA and the source synchronous clock signal DCK are transmitted through lines approximately equal to the length of the transmission line for the adjusting clock signal CCK. Accordingly, the phase difference Td, Tc1, and Tcc are approximately equal as shown in Formula 19 below.

$$Td \approx Tc1 \approx Tcc \qquad (19)$$

Moreover, the operation of the phase comparator 518 satisfies Formula 20 below.

$$Tcc + Tx = 2 \times Tck \qquad (20)$$

Moreover, the phase difference Ts between the signal D4 and the system clock SCK is as shown in Formula 21 below.

$$Ts = 3 \times Tck \, (Tc1 + Tc2 + Tx) \qquad (21)$$

Therefore, from Formulae 19, 20, and 21, the relationship between the phase difference Ts and the SCK cycle Tck becomes constant as shown in Formula 22 below.

$$Td \approx \tfrac{1}{2} \times Tck \qquad (22)$$

That is, in this example also, the phase difference between the system clock signal SCK and the signal D4 is always assured to be half of the SCK cycle. Accordingly, the flip-flop 510 can normally receive a data signal at the next timing of the system clock SCK like the signal D6. As compared to the embodiment of FIG. 1, it is possible to reduce the number of variable delay circuits for controlling the data phase regardless the number of data items transmitted. Consequently, when a plenty of data items are to be transmitted in parallel, this embodiment is advantageous from the view point of the circuit area and the circuit cost.

Figure 7:
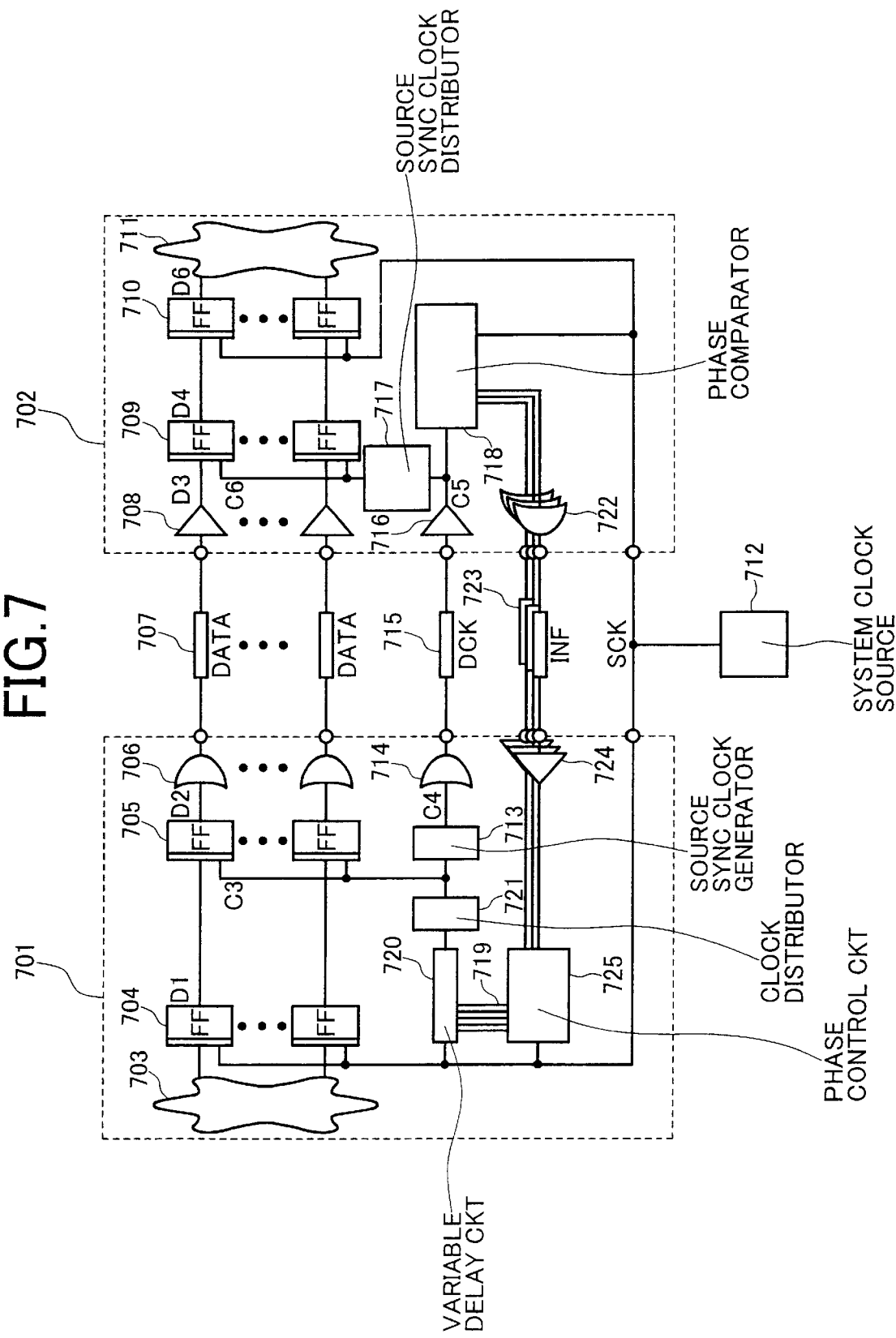
FIG. 7 is a block diagram showing an interface circuit according to yet another embodiment.

FIG. 7 shows an interface circuit according to a fourth embodiment of the present invention.

In this embodiment, a logic circuit at the reception side has a phase comparator circuit and a logic circuit at the transmission side has a variable delay circuit and a phase control circuit for controlling the variable delay circuit.

In FIG. 7, a reference symbol 701 denotes a logic circuit at the side transmitting a signal and 702 is logic circuit at the side receiving the signal. These circuits are formed as integrated circuits in FIG. 7. A plurality of data items and a source synchronous clock signal DCK are transmitted from 701 to 702. Moreover, in this embodiment, a phase difference information signal INF consisting of a plurality of bits is transmitted from the logic circuit 702 of the reception side to the logic circuit 701 of the transmission side. It should be noted that hereinafter, explanation will be given on a case using a single data signal, a single source synchronous signal, and a plurality of phase difference information signals.

In this embodiment, the phase difference information signal INF supplied to the logic circuit 701 at the transmission side is supplied via an input circuit 724 to phase control circuit 725. The phase control circuit 725 controls a variable delay circuit 720 with a control signal 719 according to the signal INF. The variable delay circuit 720 is supplied with a system clock SCK generated by a common clock signal source 712 and its phase is adjusted according to the control signal 719. The clock signal after subjected to the phase adjustment is supplied by a transmission clock distributor 721 to a flip-flop 705 transmitting a data signal and to a souce synchronous clock generator 713.

A flip-flop 704 receives the data signal from the logic circuit 703 in the logic circuit 701 and transmits the signal in synchronization with the system clock SCK. The signal is supplied to a flip-flop 705 transmitting the data signal. The flip-flop 705 transmits the signal in synchronization with the clock signal after subjected to the phase adjustment. A reference numeral 707 denotes a line for transmitting the data signal from 701 to 702 and 706 is a driver for driving the line 707. A reference symbol 708 denotes a receiver circuit for transmitting the data signal into the integrated circuit and 709 is a flip-flop for receiving the data signal at a timing of the source synchronous clock signal DCK.

Moreover, the source synchronous clock signal DCK generated in the source synchronous clock generator 713 is transmitted to the logic circuit 702 of the reception side via a driver 714 and a DCK transmission line 715. Furthermore, the source synchronous clock signal DCK is transmitted via a DCK receiver circuit 716 and a source synchronous clock distributor 717 to the flip-flop 709 for reception. The data signal received by the flip-flop 709 is received by a flip-flop 710 at the next timing of the system clock SCK and transmitted to the other logic circuit 711.

Moreover, an output signal from the DCK receiver circuit 716 is supplied to a phase comparator 718, which detects a phase difference between the source synchronous clock signal DCK and the system clock signal SCK. The detection result is output as a phase difference information signal INF via an output circuit 722 to the logic circuit of the transmission side.

With this configuration, firstly, a phase difference is detected as follows.

With the delay amount of the variable delay circuit 720 reset to 0, the source synchronous clock signal DCK is transmitted from the logic circuit 701 of the transmission side. In the logic circuit 702 at the reception side compares the phase of the source synchronous clock signal DCK and the phase of the system clock SCK and transmits a comparison result as the phase difference information signal INF to the logic circuit 701 of the transmission side. The signal INF in this example is a logic signal consisting of a plurality of bits although it is also possible to transmit an analog signal. Moreover, in this example, the signal INF is transmitted via the line 723 directly from the reception side to the transmission side but may also be transmitted via a controller for controlling the phase difference signal.

Next, a phase adjustment is performed. according to the phase information signal INF received by the logic circuit 701 of the transmission side, a phase controller 725 controls the delay amount of the variable delay circuit 720. It should be noted that a change of this delay amount changes the phase of the source synchronous clock signal DCK. The phase difference after this change is ignored by the phase comparator 718.

The operation of the data signal transmission in the fourth embodiment of the present invention is almost identical to the explanation given with reference to FIG. 2 and FIG. 6. That is, in the first phase detection stage, the signals C4 and C5 has the same phases as in FIG. 2 and a phase detection Tx is detected.

In the next phase adjustment stage, signals C3, C4, C5, C6, D1, D2, D3, D4, and D6 in FIG. 7 are identical to the ones in FIG. 6, and phases of the respective signals are adjusted according to the phase difference Tx. That is, in this example also, the signal difference between the system clock SCK and the signal D4 can always assure half of the SCK cycle. Accordingly, the flip-flop 710 is assured to receive the data signal like the signal D6 at the next timing of the system clock SCK.

In this embodiment, as compared to the embodiment of FIG. 1, regardless of the number of data items transferred, the number of variable delay circuits may be small. This embodiment eliminates need of the circuit means for generating and transmitting an adjusting clock. Instead, there arises a need of a circuit for transmitting the phase difference information to the data transmission side. However, transmission of this phase difference information may also be designed by the scanning method so that the transmission is performed by a circuit together with other information. Accordingly, this embodiment has a further advantage in the circuit cost as compared to the embodiment of FIG. 5.

Next, explanation be will given on specific configurations of the respective circuit blocks used in the aforementioned embodiments.

Figure 8:
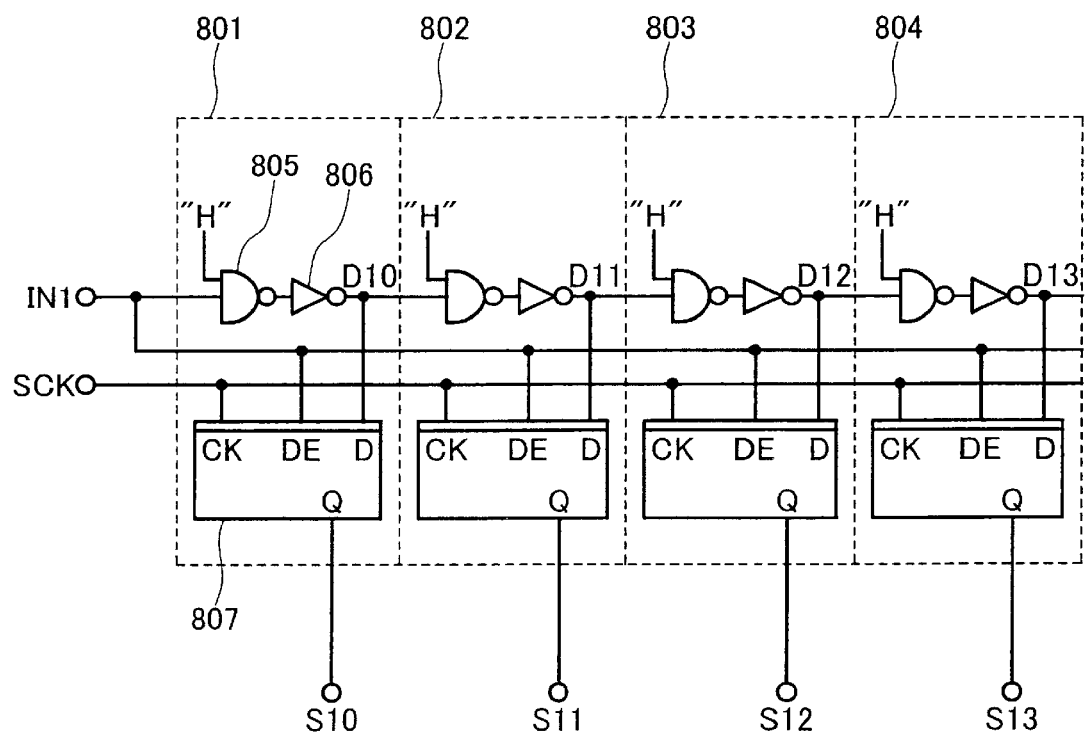
FIG. 8 is a circuit diagram of a phase comparator used in the aforementioned embodiments.

FIG. 8 shows a specific example of the phase comparator according to the present invention. In FIG. 8, reference symbols 801, 802, 803, and 804 denote detection units and they are respectively formed from a 2NAND circuit 805, an inverter circuit 806, and a flip-flop 807. The reason why the 2NAND circuit 805 and the inverter circuit 806 are used will be detailed later.

Signals to be compared, i.e., the source synchronous clock signal DCK or the adjusting clock signal CCK are supplied from a terminal IN1. Moreover, a reference signal, i.e., the system clock signal SCK is supplied from a terminal SCK.

The signal to be compared and supplied from the terminal IN1 is transmitted via the 2NAND circuit 805 in the detection unit 1 and the inverter circuit 806 to the data input D of the flip-flop 807 as well as to the next detection unit 802. Similarly, the signal is transferred successively to 802, 803, and 804. Moreover, the comparison signal supplied from the terminal IN1 is also supplied to a data enable input DE of the flip-flop of each of the detection units. The reference signal supplied from the terminal SCK is supplied to a clock input CK of the flip-flop of each of the detection units. The flip-flops of the respective detection units output Q as comparison results signals S10, S11, S12, and S13 used as the aforementioned control signal or the phase difference information signal.

Next, explanation will be given on the operation of the phase comparator with reference to FIG. 9.

Figure 9:
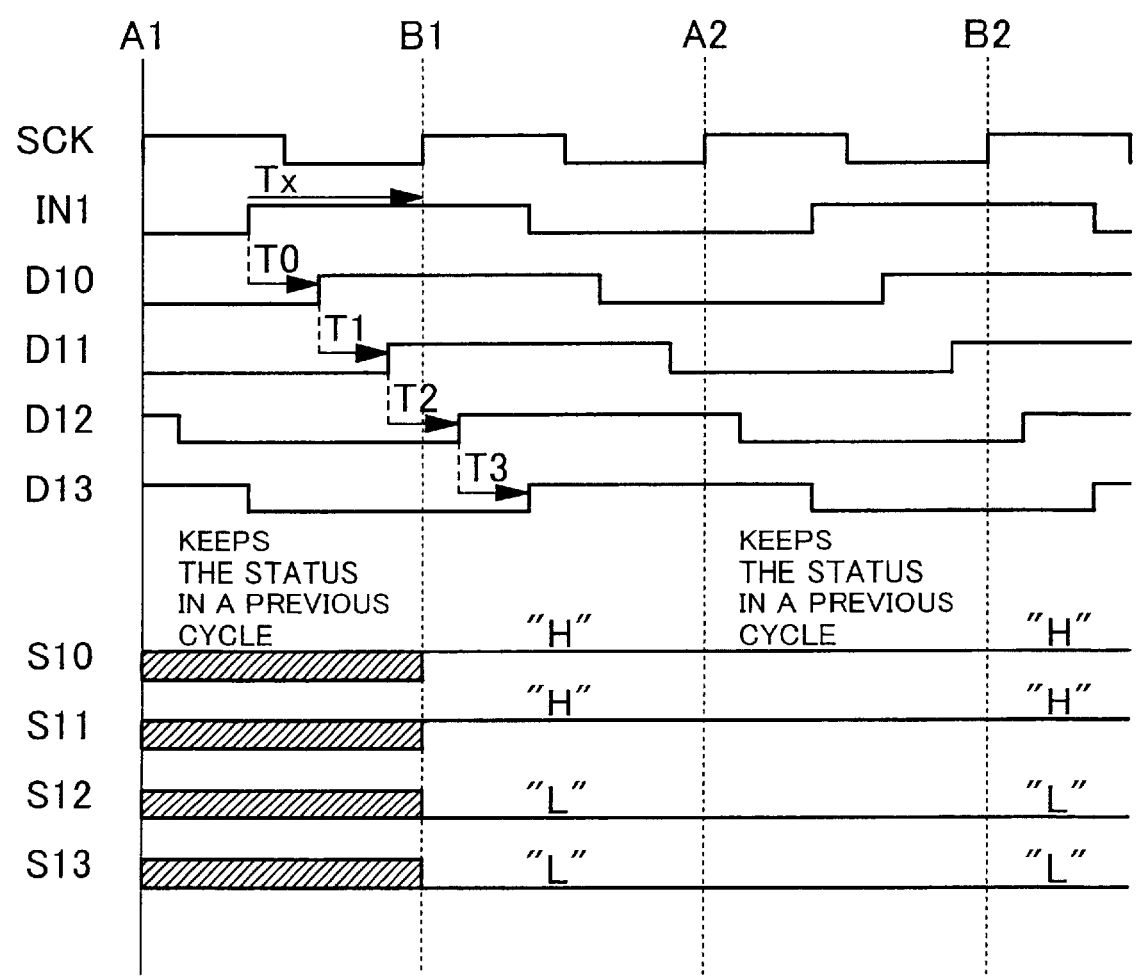
FIG. 9 shows timings of signals at respective components of the phase comparator shown in FIG. 8.

In FIG. 9, signal SCK is a reference signal and signal IN1 is a signal to be compared (hereinafter, referred to as a compared signal). Signals D10, D11, D12, and D13 are, as shown in FIG. 8, are signals supplied to the data input D of the flip-flops of the detection units 801, 802, 803, and 804. Moreover, signals S10, S11, S12, and S13 are comparison result signals.

The compared signal IN1 is delayed by T0 while being transferred through the 2NAND circuit 705 and the inverter circuit 706 to become signal D10. Similarly, the signal D10 is delayed by T1 and becomes D11. The signal D11 is delayed by T2 and becomes signal D12. The signal D12 is delayed by T3 and becomes signal D13.

Moreover, the reference signal SCK is supplied to a clock terminal CK of the flip-flop. The respective flip-flops latch values of signals supplied to the data input D at the timings A1, B1, A2, and B2, respectively if the data enable input DE is "H".

That is, in this circuit, when the phase difference between the compared signal IN1 and the reference signal SCK is Tx like in the figure for example, the IN1 is "H" at the timing B1 and comparison results signals reflecting the phase difference Tx are output to S10, S11, S12, and S13 as follows.

That is, because (Tx−T0)>0, the D10 is "H", and "H" is output to S10. Similarly, because {Tx−(T0+T1)}>0, D11 is "H" and "H" is output to S11.

Moreover, because {Tx−(T0+T1+T2)}<0, D12 is "L", which is output to S12. Similarly, {Tx (Tx−(T0+T1+T2+T3)}<0, D13 is "L", which is output to S13.

Similarly, at timing A2, IN1 is "L" and S10, S11, S12, and S13 remains in the preceding cycle state, i.e., continuously maintain the data held by B1.

As a result, unless the value of the phase difference Tx is changed, "H", "H", "L", and "L" are continuously output.

Figure 10:
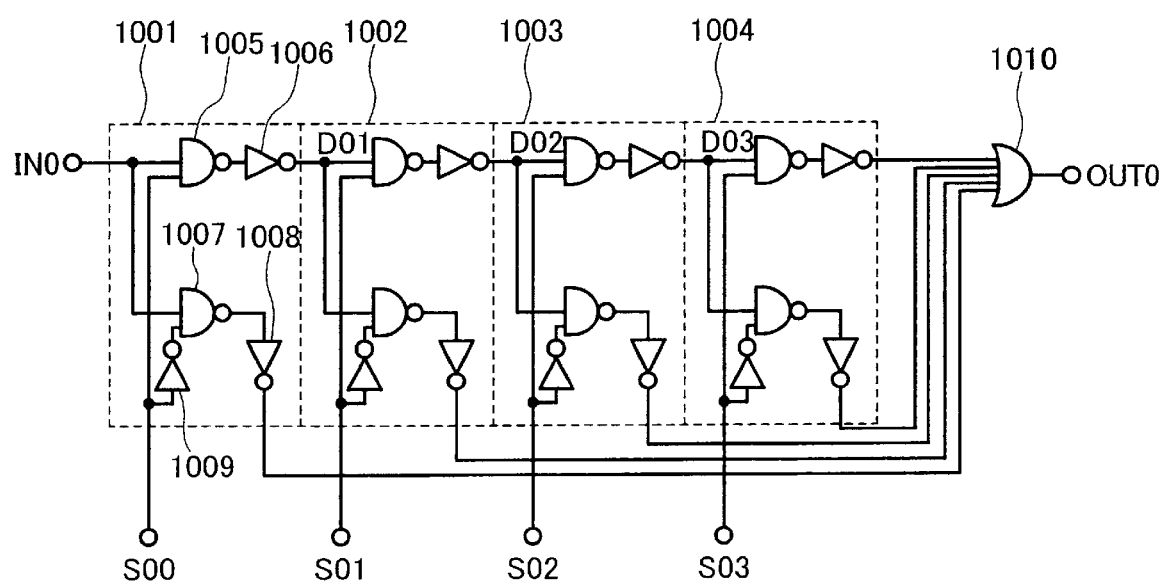
FIG. 10 is a circuit diagram of a variable delay circuit used in the aforementioned embodiments.

FIG. 10 shows a specific example of the variable delay circuit used in the embodiments.

In FIG. 10, reference symbols 1001, 1002, 1003, and 1004 are delay units, each including a 2NAND circuit 1005, 1007, and inverter circuits 1006, 1008, and 1009. In this variable delay circuit, the 2NAND circuit 1005 and 1007 have a delay time designed to be approximately equal to the delay time of the 2NAND circuit 805 of the phase comparator of FIG. 8. Moreover, the invert circuits 1006 and 1008 have a delay time designed to be approximately equal to the delay time of the 2NAND circuit 806 of the phase comparator of FIG. 8. With this configuration, the delay units 1001, 1002, 1003, and 1004 have delay time values equal to the delay time value T0, T1, T2, and T3, respectively.

Signals to be delayed, i.e., the data signal DATA or the system clock signal SCK are supplied from a terminal IN0 and output to a terminal OUT0. Moreover, the control signal is input from terminals S00, S01, S02, and S03. Delayed signals, i.e., the data signal DATA and the system clock SCK are input from the terminal IN0 and output to the terminal OUT0. Moreover, the control signal is input from the terminals S00, S01, S02, and S03. The delayed signal supplied from the input terminal IN0 is transferred, if the control signal S00 is "H", via the 2NAND circuit 1001 and the inverter circuit 1006 in the delay unit 1001 to the next delay unit 1002. Moreover, when the control signal S00 is "L", the signal is output via the 2NAND circuit 1007 and the inverter circuit 1008 in the delay unit 1001 to an OR gate 1010 and then to a terminal OUT0.

Similarly, in the delay unit 1002, when the control signal S01 is "H", the delayed signal transmitted from the delay unit 1001 is transferred to the next delay unit 1003, and when the control signal S01 is "L", the signal is transferred to the OR gate 1010 and output to the terminal OUT0. The other delay units 1003 and 1004 operate in the same way.

Next, explanation will be given on the operation of this variable delay circuit with reference to FIG. 11.

Figure 11:
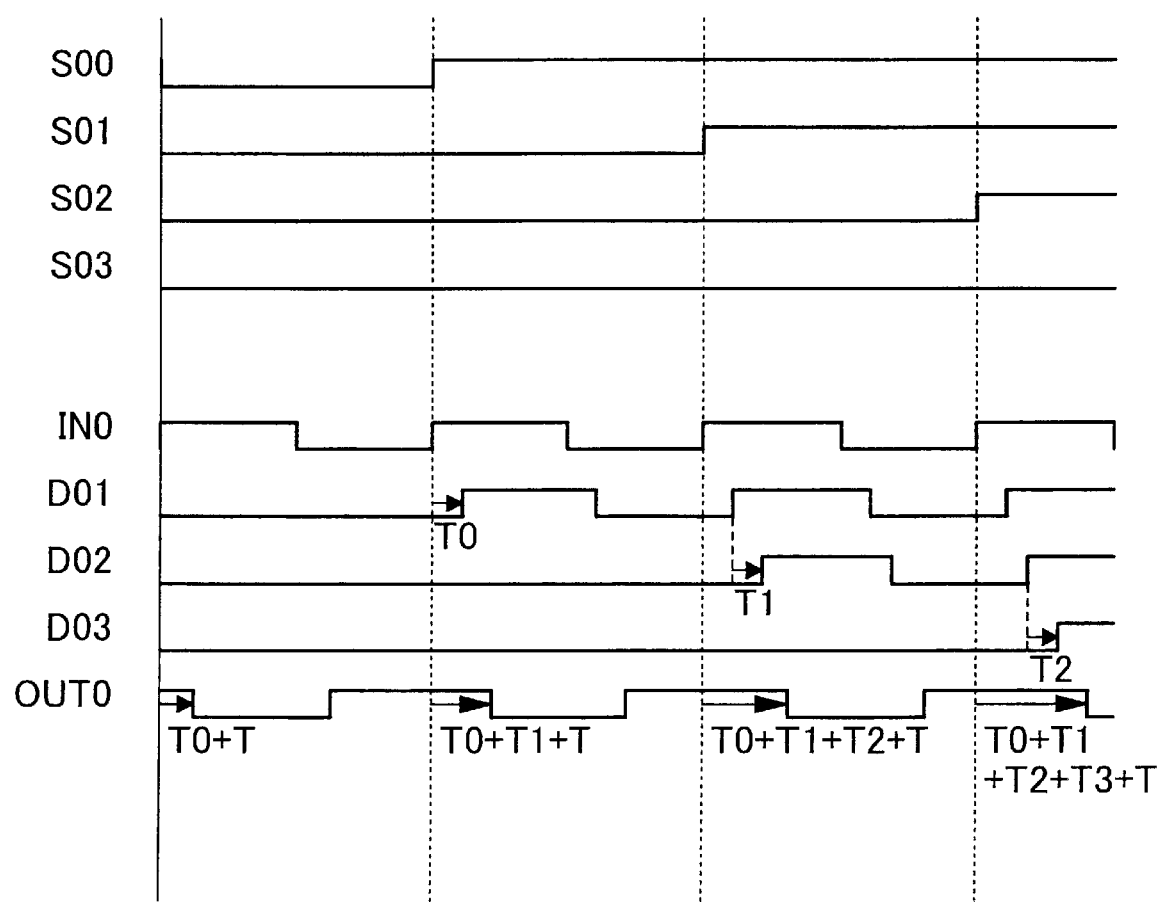
FIG. 11 shows timings of signals at respective components of the variable delay circuit shown in FIG. 10.

In FIG. 11, signals S00, S01, and S03 are control signals and signal IN0 is a delayed signal. Signals D01, D02, and D03 are signals transferred from the delay units 1001, 1002, and 1003 to the next delay unit. Moreover, signal OUT0 is an output signal from the variable delay circuit.

In FIG. 11, when the control signals S00, S01, and S03 are "L", the delayed signal IN0 is delayed by T0 while being transferred through the 2NAND circuit 1007 and the inverter circuit 1008 in the delay unit 1001 and is delayed by T while transferred via the OR gate 1008 to OUT0. As a result, the signal OUT0 has a phase delayed from the signal IN0 by (T0+T). Moreover, in this case, the signals D01, D02, and D03 remain "L".

When the control signal S00 is "H" and S01, S02, and S03 are "L", the delayed signal IN0 is delayed by T0 while being transferred through the 2NAND circuit 1005 and the inverter circuit 1006 in the delay unit 1001 and then transferred to the next delay unit 1002.

In the delay unit 1002, the control signal S01 is "L" and accordingly, the signal is delayed by T1 in the same way and further delayed by T while passing through the OR gate to be output to OUT0. As a result, the signal OUT0 has a phase delayed from the signal IN0 by (T0+T1+T).

Similarly, when the control signals S00 and S01 are "H" and S02 and S03 are "L", the signal OUT0 has a phase delayed from the signal IN0 by (T0+T1+T2+T), and when the control signals S00, S01, S02 are "H" and S03 is "L", the signal OUT0 has a phase delayed from the signal IN0 by (T0+T1+T2+T3+T).

That is, in this circuit, the phase comparison results S10, S11, S12, and S13 output from the phase comparator are supplied as control signals to S00, S01, S02, and S03, so that as shown in FIG. 9 for example, when the phase difference between the compared signal IN1 and the reference signal SCK supplied to the phase comparator is Tx, "H", "H", "L" and "L" are given to the control signals S00, S01, S02, and S03, respectively. Accordingly, the delayed signal IN0 is output to OUT0 with a delay of (T0+T1+T) as shown in FIG. 11.

Consequently, with this configuration, it is possible to make the delay amount (T0+T1+T) in the variable delay circuit approximately identical to the phase difference Tx between the compared signal IN1 and the reference signal SCK.

Strictly speaking, the delay amount (T0+T1+T) is different from the phase difference Tx because it includes errors of the delay time T by the OR gate 1010 and the delay time T2 of the one delay unit. However, it is possible to reduce these values to a degree that can be ignored practically.

Figure 12:
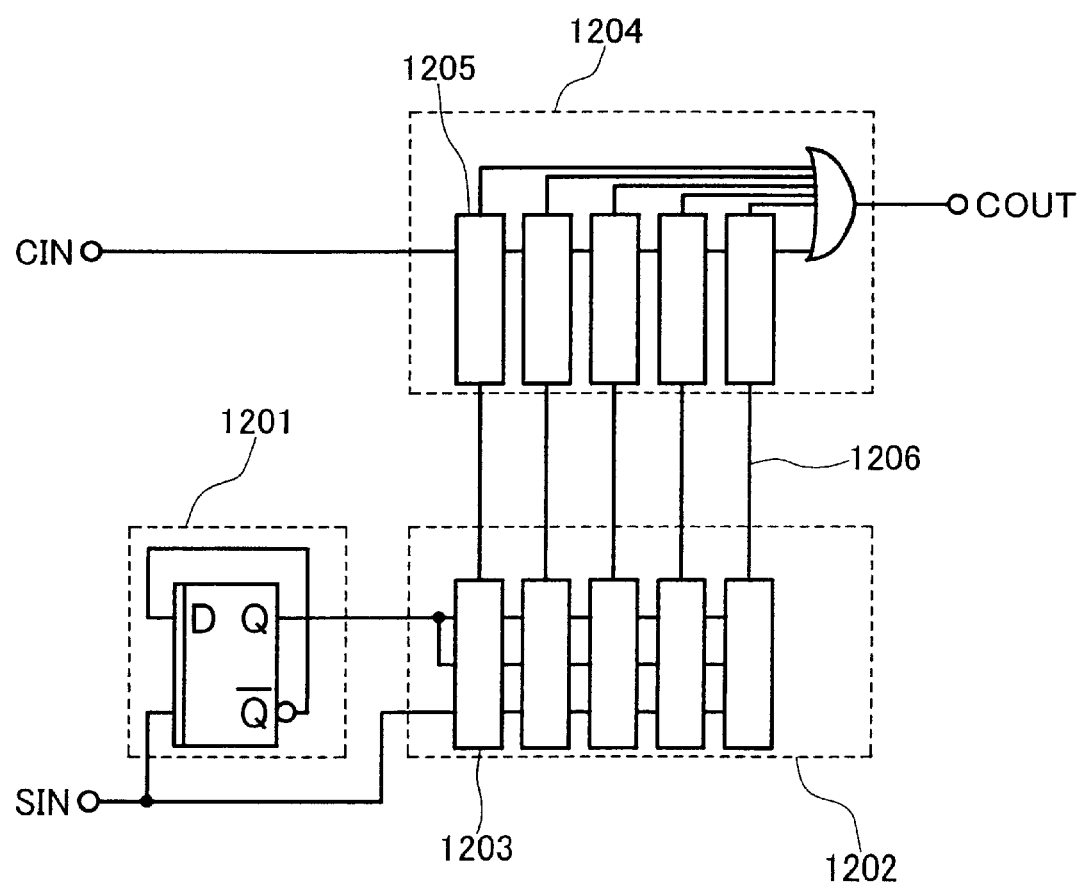
FIG. 12 is a circuit diagram of a clock distributor used in the aforementioned embodiments.
Figure 13:
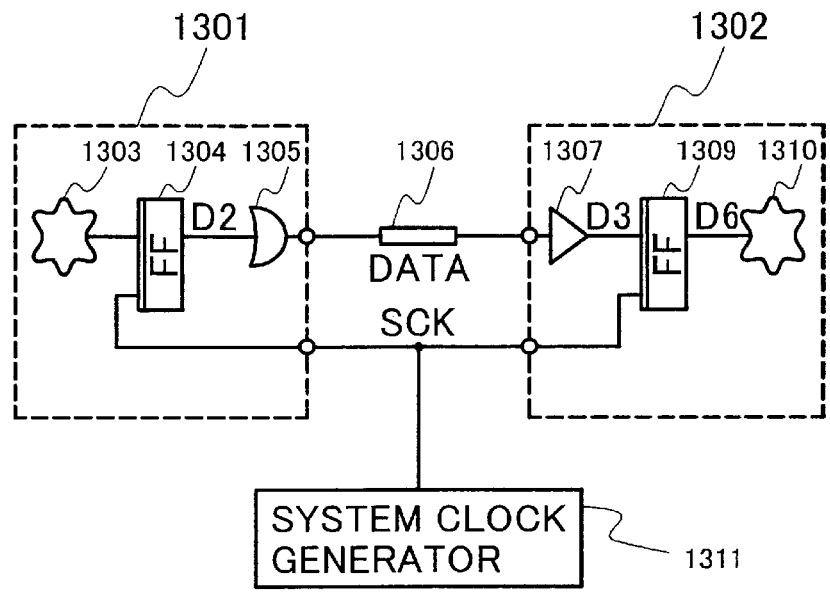
FIG. 13 shows an example of the conventional interface circuit.
Figure 14:
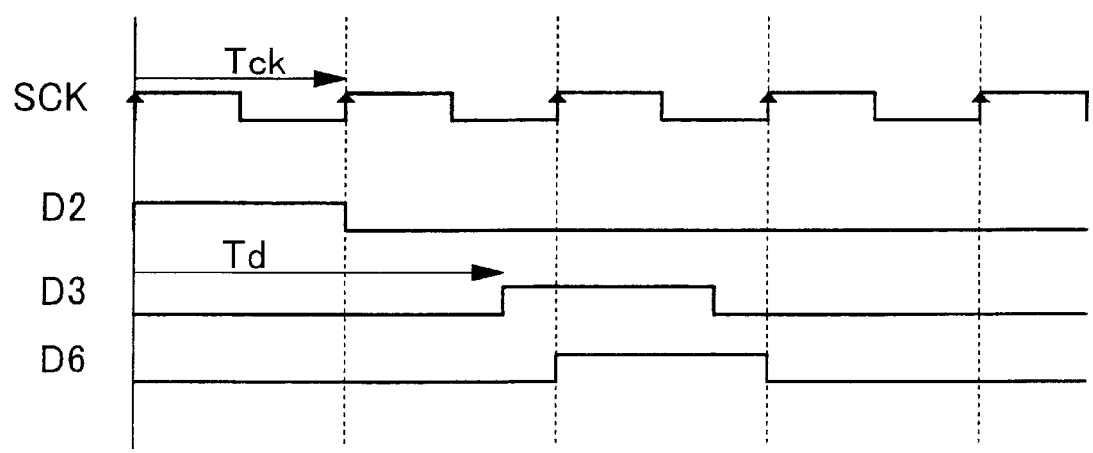
FIG. 14 is a diagram showing a timing relationship between signals at respective components of the interface circuit shown in FIG. 13.
Figure 15:
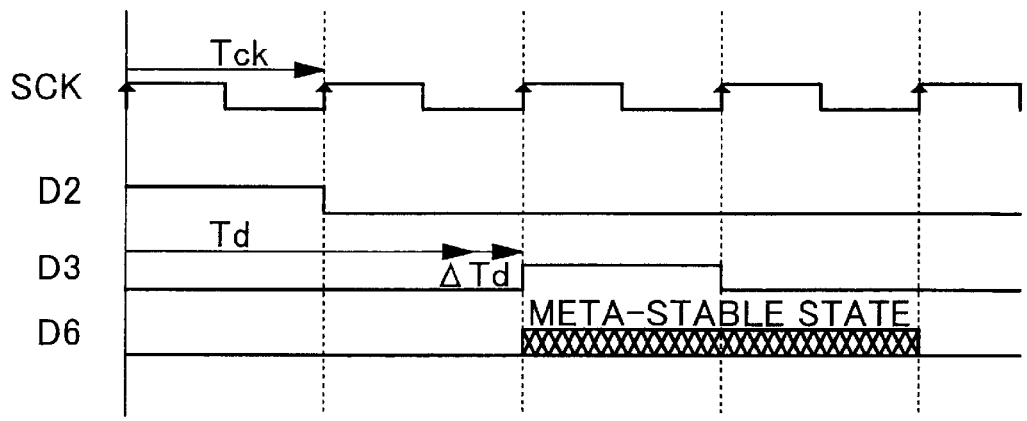
FIG. 15 is a diagram showing timings of signals at respective components of the interface circuit of FIG. 13 when a meta-stable state is generated.
Figure 16:
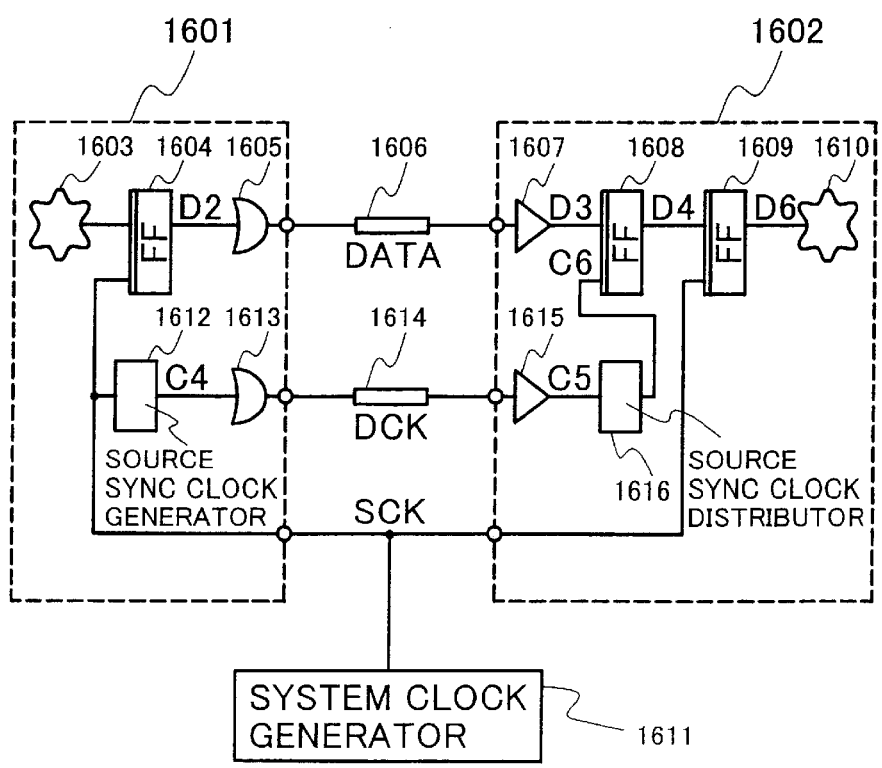
FIG. 16 is a block diagram showing an example of another conventional interface circuit.
Figure 17:
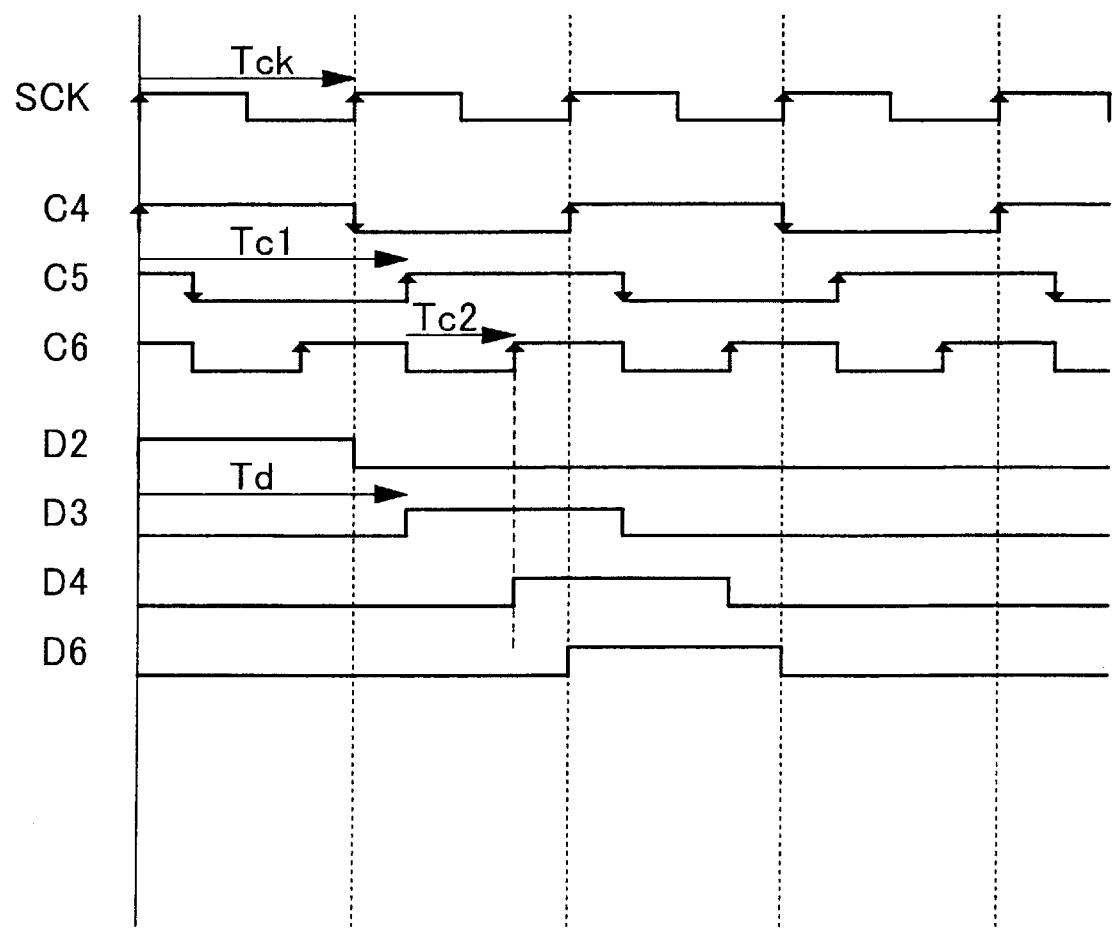
FIG. 17 is a diagram showing timings of signals at respective components of the interface circuit shown in FIG. 16.
Figure 18:
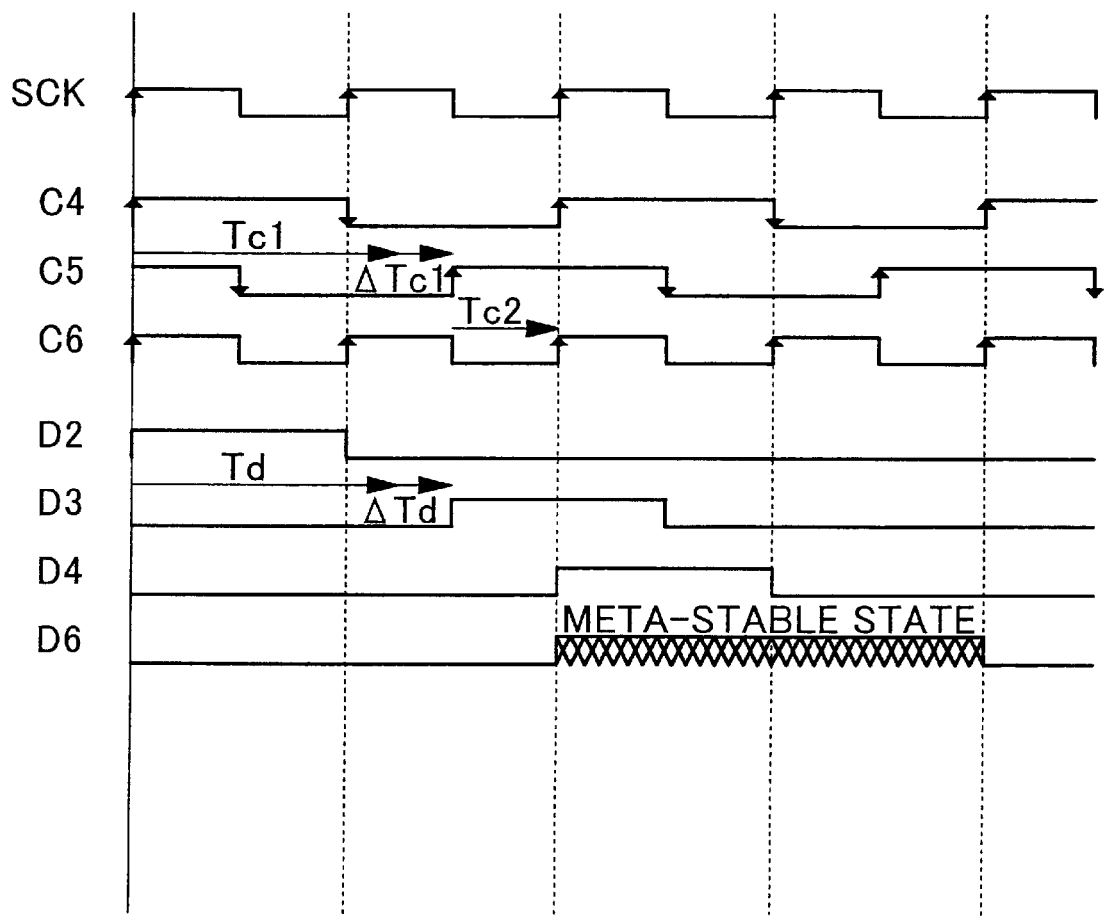
FIG. 18 is a diagram showing timings of signals at respective components of the interface circuit of FIG. 16 when a meta-stable state is generated.

FIG. 12 shows a specific configuration of a clock distributor 117 used in the first embodiment shown in FIG. 1. The clock distributor 517 in the embodiment of FIG. 5 and the clock distributor in the embodiment of FIG. 7 can have a configuration completely identical to that of FIG. 12.

As has been described with reference to Formula 5, this clock distributor 117 not only distribute the received source synchronous clock for data reception but also it should give a delay time Tc2 to about ½ of the system clock cycle Tck. When the system clock cycle is a fixed value, this delay can easily be realized by using a delay circuit consisting of inverter circuits connected in multiple stages. However, when the system clock cycle changes, its delay time should be changed and accordingly, it is not appropriate to employ a multiple connection of inverters. To cop with this, the distributor in FIG. 12 has such a configuration that the delay time Tc2 is adjusted so as to be about ½ of the system clock cycle Tck even when the system clock cycle changes.

In FIG. 12, SIN is a system clock input terminal. CIN is an input terminal of a source synchronous signal to be adjusted. An output of the receiver circuit 116 shown in FIG. 1 is connected to CIN. COUT is an output terminal for outputting a signal after adjusted and is connected to the flip-flop 109 in FIG. 1. A reference symbol 1201 denotes a clock frequency divider consisting of a flip-flop and is shown as a divide-by-two frequency divider in the figure. A reference symbol 1202 is a clock cycle detection circuit (phase comparator), and 1204 is a delay circuit (variable delay circuit). A detection result of the phase comparator 1202 is transmitted as a control signal 1206 to the variable delay circuit 1204 to control its delay amount.

It should be noted that the phase comparator has a specific configuration identical to FIG. 10 and consists of a plurality of delay units 1205.

In this clock distributor, the ratio of the delay time of the delay units 1205 against the detection units 1203 is set to a desired value. Thus, it is possible to delay the phase of the adjusted signal fed to the input terminal CIN by a delay time to follow the cycle of the system clock signal fed to SIN, with a constant ratio when output to the output terminal COUT.

For example, when the delay time of the delay units 1205 is set to be ½ of the delay time of the detection units 1203, the clock signal fed to the input terminal CIN, i.e., the adjusted signal is delayed by ½ of the system clock signal fed to SIN while passing through the variable delay circuit 1204 and output to the output terminal COUT.

Moreover, even when the system clock cycle changes, the change can be adjusted by the phase comparator 120 so as to change the control signal 1206, thereby adjusting the delay time of the variable delay circuit 1204. For this, the adjusted signal fed to the input terminal CIN changes its phase according to the change of the system clock cycle so as to maintain the ratio of the delay time from CIN to COUT against the system clock cycle to be ½ as is designed.

As has been described above, according to the embodiments, even when the delay time of data transmission is changed due to production process irregularities, the change is automatically adjusted to assure a phase different for correctly receiving data. Thus, it is possible to evade generation of a meta-stable state and realize a normal and high-speed data transmission. The circuit configuration for realizing this is not to be limited to those shown in the figures but can be modified in various ways without departing from the spirit of the invention.

What is claimed is:

1. An interface circuit comprising a plurality of logic circuits including at least a first logic circuit and a second logic circuit operating by receiving a system clock distributed from a common clock signal source, wherein
    the first logic circuit includes: data transmission means for transmitting a data signal in synchronization with the system clock and source synchronous clock transmission means for transmitting a source synchronous clock indicating a transmission timing of the data signal,
    the second logic circuit receiving the transmitted data signal includes: a clock distributor for generating a reception clock based on the received signal of the source synchronous clock; a first reception flip-flop for taking in the data signal transmitted in synchronization with the reception clock; a variable delay circuit connected to an output of the first reception flip-flop; a second flip-flop for taking in the data signal from the variable delay circuit in synchronization with the system clock; and a phase comparator for detecting a phase difference between the reception signal of the source synchronous clock and the system clock and controlling a delay amount of the variable delay circuit to be a value corresponding to the phase difference.

2. The interface circuit as claimed in claim 1, wherein the phase comparator includes a plurality of detection units, each having a delay circuit for delaying a received signal of the source synchronous clock and a flip-flop for maintaining a logic value of a clock signal flowing in the delay circuit at the timing of the system clock signal and outputting it as a phase comparison result signal, wherein the plurality of detection units are connected in series so that delayed signals are successively transferred.

3. The interface circuit as claimed in claim 1, wherein the variable delay circuit consists of a plurality of delay units connected to each other for successively transferring a received data signal as a signal to be delayed, so that the delay time of the data signal is changed, and the number of delay units through which the delayed signal is to be passed is controlled by the phase comparison result signal.

4. The interface circuit as claimed in claim 1, wherein the phase comparator includes a plurality of detection units, each having a delay circuit for delaying a received signal of the source synchronous clock and a flip-flop for maintaining a logic value of a signal flowing in the delay circuit at the timing of the system clock signal and outputting it as a phase comparison result signal, and the plurality of detection units are connected in series so that the delayed signals are successively transferred, and wherein the variable delay circuit includes a plurality of delay units connected to each other for successively transferring a received data signal to be delayed and changing the delay time of the data signal, and the number of delay units through which the signal to be delayed passes is controlled by the phase comparison result signal, and wherein a delay time required for transferring a signal to be delayed through one of the detection unit of the phase comparator circuit is set to be approximately equal to a delay time required for transferring a signal to be delayed through one of the delay units in the variable delay circuit.

5. The interface circuit as claimed in claim 1, wherein the clock distributor distributes a received signal of the source synchronous clock with a delay equivalent to a half cycle of the system clock, as a reception clock to the first flip-flop.

6. The interface circuit as claimed in claim 5, wherein the clock distributor includes: a divider for dividing the system clock; a clock cycle detection circuit supplied with the output from the divider and the system clock to detect a cycle of the system clock and producing a detection signal corresponding to a half cycle of the system clock; and a clock delay circuit having a plurality of unit delay circuits for successively delaying the source synchronous clock received, wherein the number of the unit delay circuits for passing the source synchronous clock as a signal to be delayed is controlled by the detection signal.

7. The interface circuit as claimed in claim 6, wherein the clock cycle detection circuit includes a plurality of clock cycle detection units, each having a delay circuit for delaying an output from the divider circuit and a flip-flop for taking in the logic value of an output of the delayed divider circuit at the timing given by the system clock and outputting it as the detection signal, wherein the plurality of clock cycle detection units are connected in series so that the output from the divider circuit as the signal to be delayed is successively delayed.

8. An interface circuit comprising a plurality of logic circuits including at least a first logic circuit and a second logic circuit operating by receiving a system clock distributed from a common clock signal source, wherein the first logic circuit includes: data transmission means for transmitting a data signal in synchronization with a transmission clock and source synchronous clock transmission means for transmitting a source synchronous clock indicating a transmission timing of the data signal, the second logic circuit receiving the transmitted data signal includes: a clock distributor for generating a reception clock based on the received signal of the source synchronous clock; a first reception flip-flop for taking in the data signal transmitted in synchronization with the reception clock; a second flip-flop for taking an output from the first flip-flop in synchronization with the system clock; and an adjustment clock generator for generating an adjustment clock and transmitting the clock to the first logic circuit, the first logic circuit further including: a variable delay circuit for delaying the system clock so that a delayed output is fed to the data transmission means as the data transmission clock; and a phase comparator for detecting a phase difference between the adjustment clock received and the system clock, so as to control a delay amount of the variable delay circuit according to the detected phase difference.

9. The interface circuit as claimed in claim 8, wherein the phase comparator includes a plurality of detection units, each having a delay circuit for delaying a received signal of the adjustment clock and a flip-flop for maintaining a logic value of a signal flowing in the delay circuit at the timing of the system clock signal and outputting it as a phase comparison result signal, wherein the plurality of detection units are connected in series so that delayed signals are successively transferred.

10. The interface circuit as claimed in claim 8, wherein the variable delay circuit consists of a plurality of delay units connected to each other for successively transferring a system clock as a signal to be delayed, so that the delay time of the system clock is changed, and the number of delay units through which the delayed signal is to be passed is controlled by the phase comparison result signal.

11. The interface circuit as claimed in claim 8, wherein the phase comparator includes a plurality of detection units, each having a delay circuit for delaying a received signal of the adjustment clock and a flip-flop for maintaining a logic value of a signal flowing in the delay circuit at the timing of the system clock and outputting it as a phase comparison result signal, and the plurality of detection units are connected in series so that delayed signals are successively transferred, and wherein the variable delay circuit consists of a plurality of delay units connected to each other for successively transferring a received data signal to be delayed and changing the delay time of the data signal, and the number of delay units through which the signal to be delayed passes is controlled by the phase comparison result signal, and wherein a delay time required for transferring a signal to be delayed through one of the detection unit of the phase comparator circuit is set to be approximately equal to a delay time required for transferring a signal to be delayed through one of the delay units in the variable delay circuit.

12. The interface circuit as claimed in claim 8, wherein the clock distributor distributes a received signal of the source synchronous clock with a delay equivalent to a half cycle of the system clock, as a reception clock to the first flip-flop.

13. The interface circuit as claimed in claim 12, wherein the clock distributor includes: a divider for dividing the system clock; a clock cycle detection circuit supplied with the output from the divider and the system clock to detect a cycle of the system clock and producing a detection signal corresponding to a half cycle of the system clock; and a clock delay circuit having a plurality of unit delay circuits for successively delaying the source synchronous clock received, wherein the number of the unit delay circuits for passing the source synchronous clock as a signal to be delayed is controlled by the detection signal.

14. The interface circuit as claimed in claim 13, wherein the clock cycle detection circuit includes a plurality of clock cycle detection units, each having a delay circuit for delaying an output from the divider circuit and a flip-flop for taking in the level of an output of the delayed divider circuit at the timing given by the system clock and outputting it as the detection signal, wherein the plurality of clock cycle detection units are connected in series so that the output from the divider circuit as the signal to be delayed is successively delayed.

* * * * *